United States Patent
Hoyda et al.

(10) Patent No.: US 10,125,918 B2
(45) Date of Patent: *Nov. 13, 2018

(54) MOUNTING SYSTEM FOR A CAMERA

(71) Applicant: Serge B. Hoyda, Great Neck, NY (US)

(72) Inventors: Serge B. Hoyda, Great Neck, NY (US); Zachary Bernard Hines, Jackson Heights, NY (US)

(73) Assignee: Serge B. Hoyda, Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/898,130

(22) PCT Filed: Dec. 11, 2015

(86) PCT No.: PCT/US2015/065407
§ 371 (c)(1),
(2) Date: Dec. 13, 2015

(87) PCT Pub. No.: WO2016/094882
PCT Pub. Date: Jun. 16, 2016

(65) Prior Publication Data
US 2017/0268716 A1    Sep. 21, 2017

Related U.S. Application Data

(60) Provisional application No. 62/091,346, filed on Dec. 12, 2014, provisional application No. 62/181,165, filed on Jun. 17, 2015.

(51) Int. Cl.
*H04M 1/02* (2006.01)
*F16M 13/02* (2006.01)
(Continued)

(52) U.S. Cl.
CPC .......... *F16M 13/02* (2013.01); *F16M 13/022* (2013.01); *G02B 7/02* (2013.01);
(Continued)

(58) Field of Classification Search
CPC .......... H05K 7/00–7/2099; H05K 5/00–5/069; G06T 2207/30221–2207/30236;
(Continued)

(56) References Cited

U.S. PATENT DOCUMENTS

| 4,892,386 A | 1/1990 | Suzuki et al. |
| 5,096,287 A | 3/1992 | Kakinami et al. |

(Continued)

FOREIGN PATENT DOCUMENTS

| EP | 0 990 834 A1 | 4/2000 |
| WO | 2006/027563 A1 | 3/2006 |

(Continued)

OTHER PUBLICATIONS

International Search Report of PCT/US15/65255, dated Mar. 29, 2016.

(Continued)

*Primary Examiner* — Xi Wang
(74) *Attorney, Agent, or Firm* — Collard & Roe, P.C.

(57) ABSTRACT

There is disclosed an apparatus comprising: at least one mount; at least one electronic device configured to be coupled to the mount; at least one camera coupled to the electronic device and to the mount; wherein said at least one mount comprises at least one coupling element for coupling said at least one electronic device to the at least one mount and wherein the mount is configured to allow the electronic device to be mounted on a surface. The electronic device can comprise a screen. The mount can comprise a body to receive the electronic device. In one embodiment the mount comprises at least one adjustable arm. In one embodiment the adjustable arm comprises a ball and socket joint. In one embodiment the camera further comprises at least one lens assembly. In one embodiment the lens assembly and the mount further comprise a screw connection. In addition, in (Continued)

at least one embodiment there can be a projector which can be used to project an image of a person being viewed by the camera.

17 Claims, 45 Drawing Sheets

(51) Int. Cl.
*G02B 7/02* (2006.01)
*G03B 17/56* (2006.01)
(52) U.S. Cl.
CPC ........ *G03B 17/561* (2013.01); *H04M 1/0291* (2013.01); *H04M 1/0264* (2013.01)
(58) Field of Classification Search
CPC ......... G03B 21/00–21/64; G03B 17/54; G08B 13/196–13/19697
USPC ........ 361/600–837; 348/333.1, 143–160, 46; 349/5–10
See application file for complete search history.

(56) References Cited

U.S. PATENT DOCUMENTS

| | | | |
|---|---|---|---|
| 5,727,960 | A | 3/1998 | Zehrung |
| 6,115,651 | A | 9/2000 | Cruz |
| 6,122,865 | A | 9/2000 | Branc et al. |
| 6,859,148 | B2 | 2/2005 | Miller et al. |
| 6,954,152 | B1 | 10/2005 | Matthews |
| 7,049,945 | B2 | 5/2006 | Breed et al. |
| 8,004,425 | B2 | 8/2011 | Hoek et al. |
| 8,624,716 | B2 | 1/2014 | Englander |
| 2002/0003571 | A1 | 1/2002 | Schofield et al. |
| 2002/0124479 | A1 | 9/2002 | Branc et al. |
| 2003/0095185 | A1* | 5/2003 | Naifeh ................... H04N 7/185 348/156 |
| 2004/0211868 | A1 | 10/2004 | Holmes et al. |
| 2005/0007451 | A1* | 1/2005 | Chiang ............ G08B 13/19634 348/143 |
| 2006/0197019 | A1 | 9/2006 | Satou |
| 2006/0221183 | A1 | 10/2006 | Sham |
| 2007/0035385 | A1 | 2/2007 | Miyahara |
| 2007/0080267 | A1* | 4/2007 | Richter ................... B60R 11/02 248/160 |
| 2007/0084500 | A1* | 4/2007 | Chen ...................... F16M 11/14 136/244 |
| 2007/0170321 | A1 | 7/2007 | Smed |
| 2008/0099655 | A1* | 5/2008 | Goodman .............. F16M 11/14 248/674 |
| 2008/0117298 | A1 | 5/2008 | Torres |
| 2008/0136915 | A1 | 6/2008 | Iwamura |
| 2008/0203308 | A1 | 8/2008 | Yoo |
| 2009/0091618 | A1 | 4/2009 | Anderson |
| 2010/0231719 | A1 | 9/2010 | Nakamura et al. |
| 2010/0315507 | A1 | 12/2010 | Chrobocinski et al. |
| 2010/0321408 | A1 | 12/2010 | Miceli et al. |
| 2011/0267466 | A1 | 11/2011 | Brester |
| 2011/0292213 | A1* | 12/2011 | Lacey .................... H04N 7/181 348/153 |
| 2012/0105638 | A1 | 5/2012 | Englander |
| 2013/0169469 | A1 | 7/2013 | Mitsuta et al. |
| 2013/0193173 | A1 | 8/2013 | Bonito et al. |
| 2015/0002633 | A1 | 1/2015 | Hayashi et al. |
| 2015/0002642 | A1 | 1/2015 | Dressler |
| 2015/0282346 | A1 | 10/2015 | Ganim et al. |
| 2016/0050399 | A1 | 2/2016 | Chuter et al. |
| 2016/0062217 | A1 | 3/2016 | Slater |
| 2016/0288713 | A1 | 10/2016 | Hoyda et al. |
| 2017/0026555 | A1* | 1/2017 | Hoyda ................. G03B 17/561 |

FOREIGN PATENT DOCUMENTS

| | | |
|---|---|---|
| WO | 2007/081894 A2 | 7/2007 |
| WO | 2014/162260 A1 | 10/2014 |
| WO | 2016/094801 A1 | 6/2016 |
| WO | 2016/094882 A1 | 6/2016 |

OTHER PUBLICATIONS

International Search Report of PCT/US15/65407, dated Feb. 25, 2016.
International Preliminary Report on Patentability and Written Opinion of the International Searching Authority of PCT/US2015/065255 dated Jun. 22, 2017.
International Preliminary Report on Patentability and Written Opinion of the International Searching Authority of PCT/US2015/065407 dated Jun. 22, 2017.
Non-Final Office Action in U.S. Appl. No. 15/161,173 dated Jan. 30, 2017.
Final Office Action in U.S. Appl. No. 15/161,173 dated Apr. 24, 2017.
International Search Report and Written Opinion of the International Searching Authority with Notice of Transmittal of the International Search Report and Written Opinion of PCT/US17/27972, dated Jun. 29, 2017.
Non-Final Office Action in U.S. Appl. No. 15/161,189 dated Nov. 3, 2016.
Final Office Action in U.S. Appl. No. 15/161,189 dated Mar. 9, 2017.
Non-Final Office Action in U.S. Appl. No. 15/161,173 dated Sep. 6, 2017.
Non-Final Office Action in U.S. Appl. No. 14/898,129 dated Oct. 12, 2017.

* cited by examiner

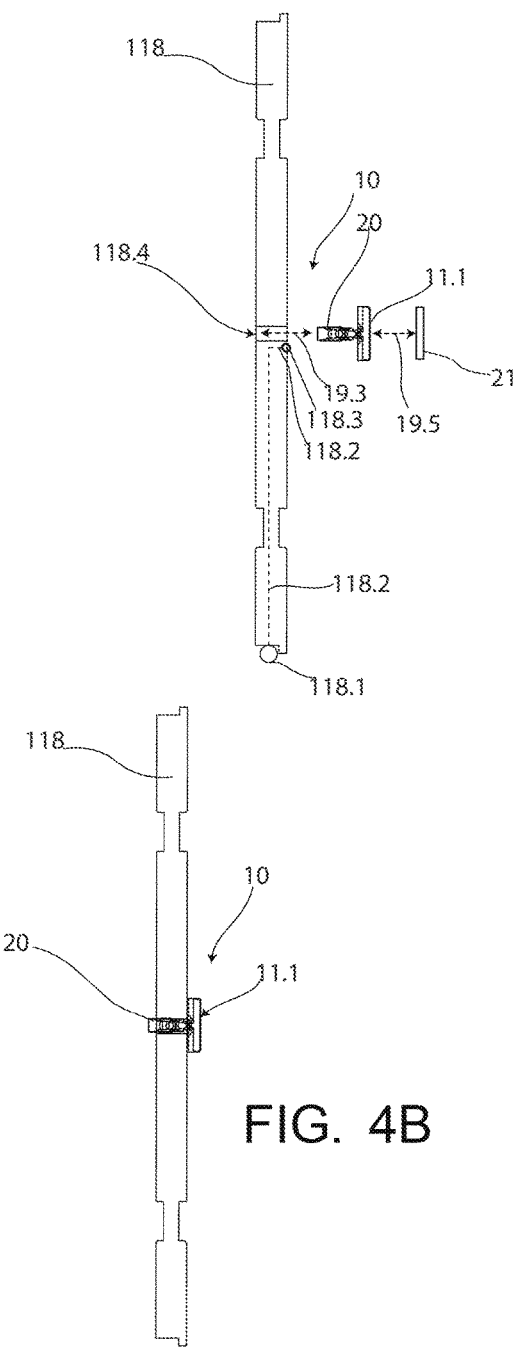
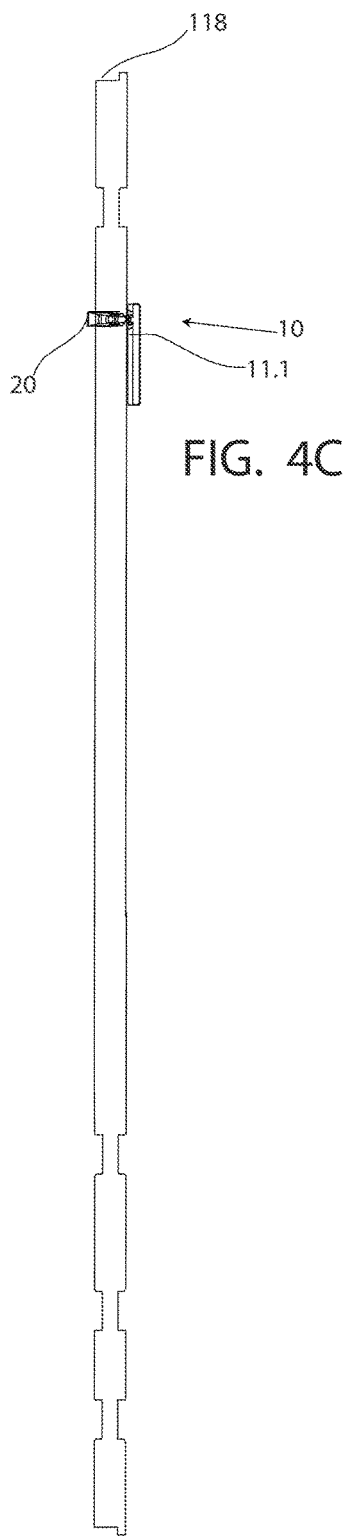
FIG. 4A
FIG. 4B
FIG. 4C

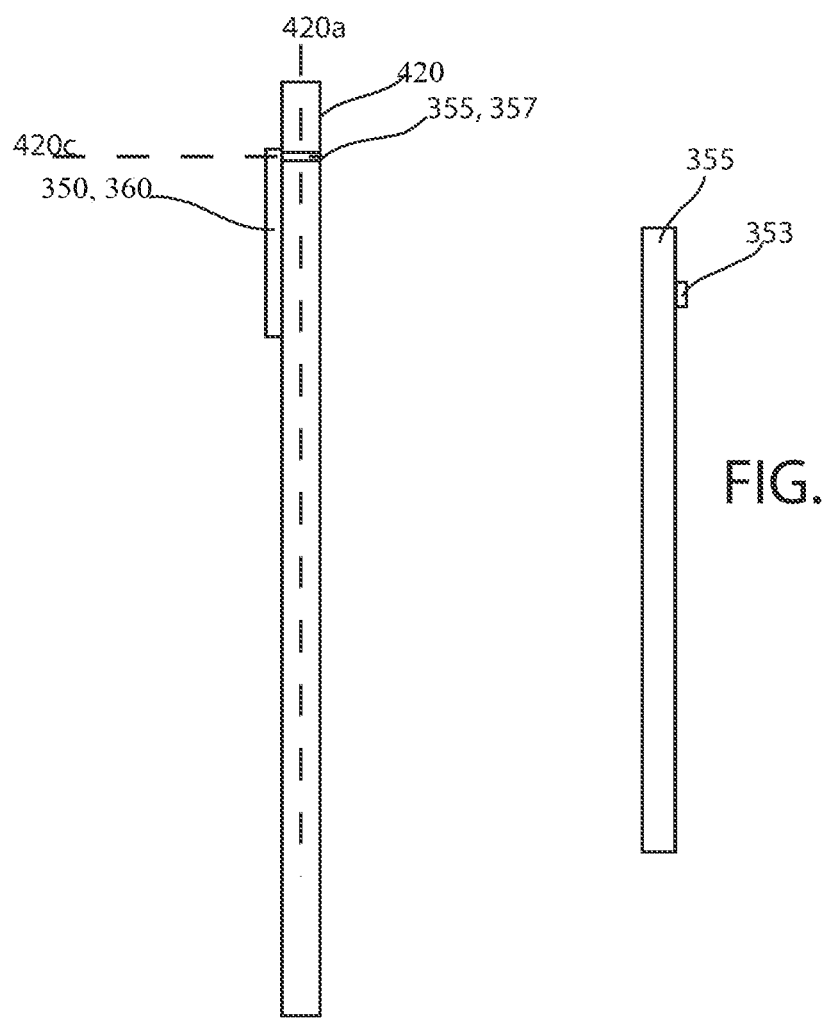

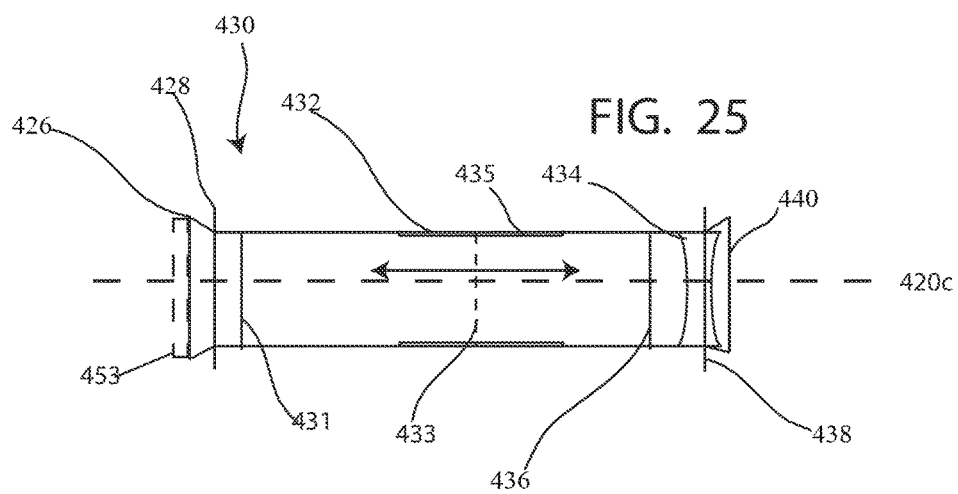

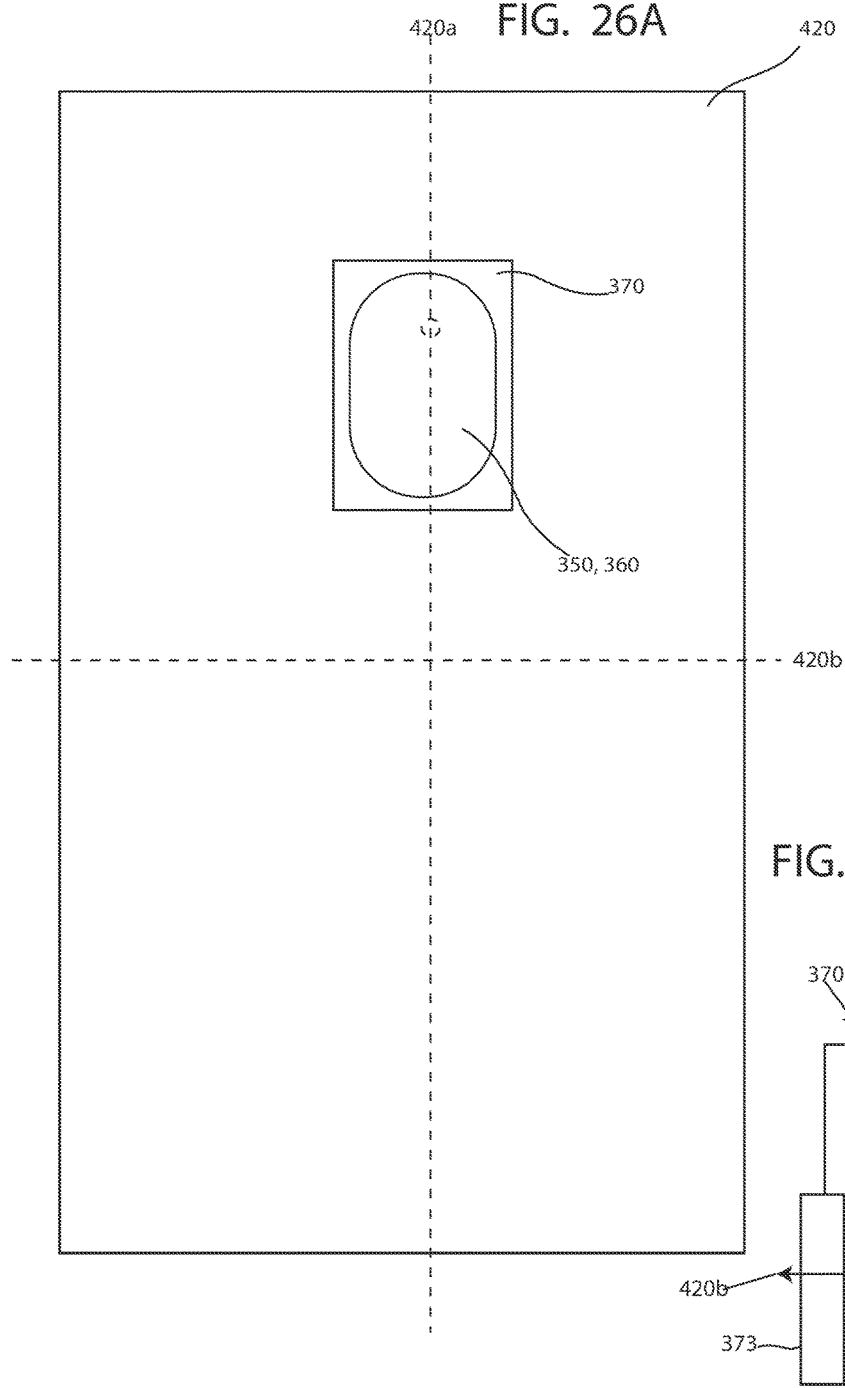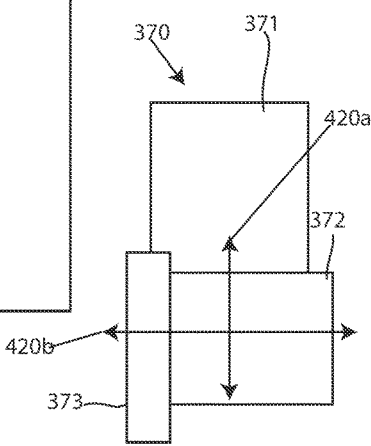

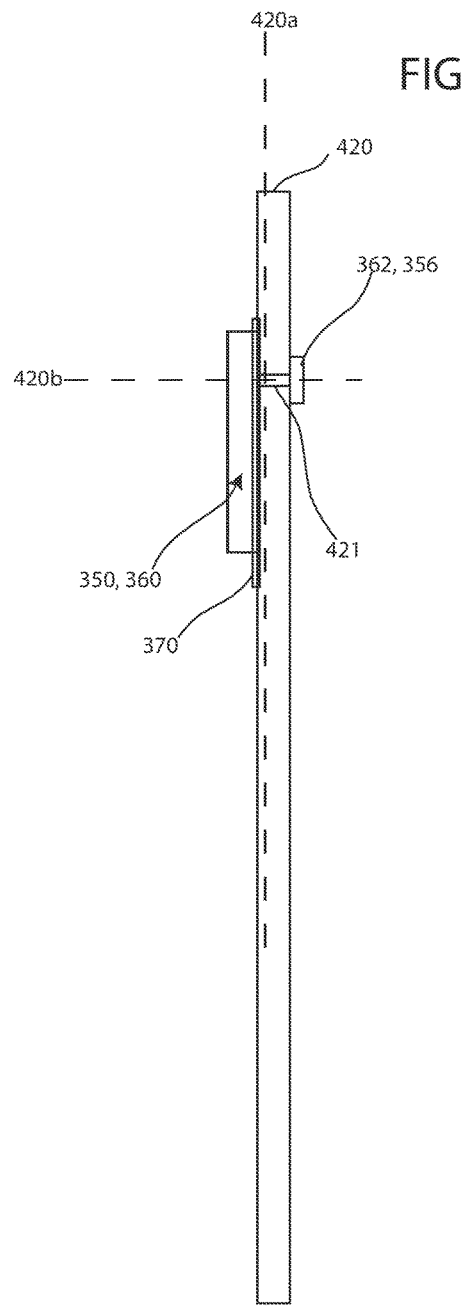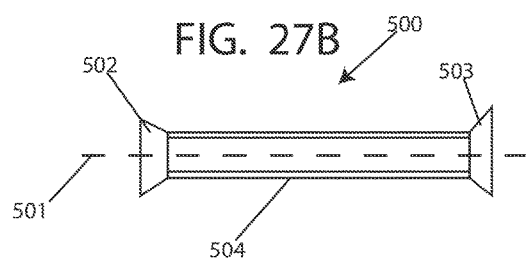

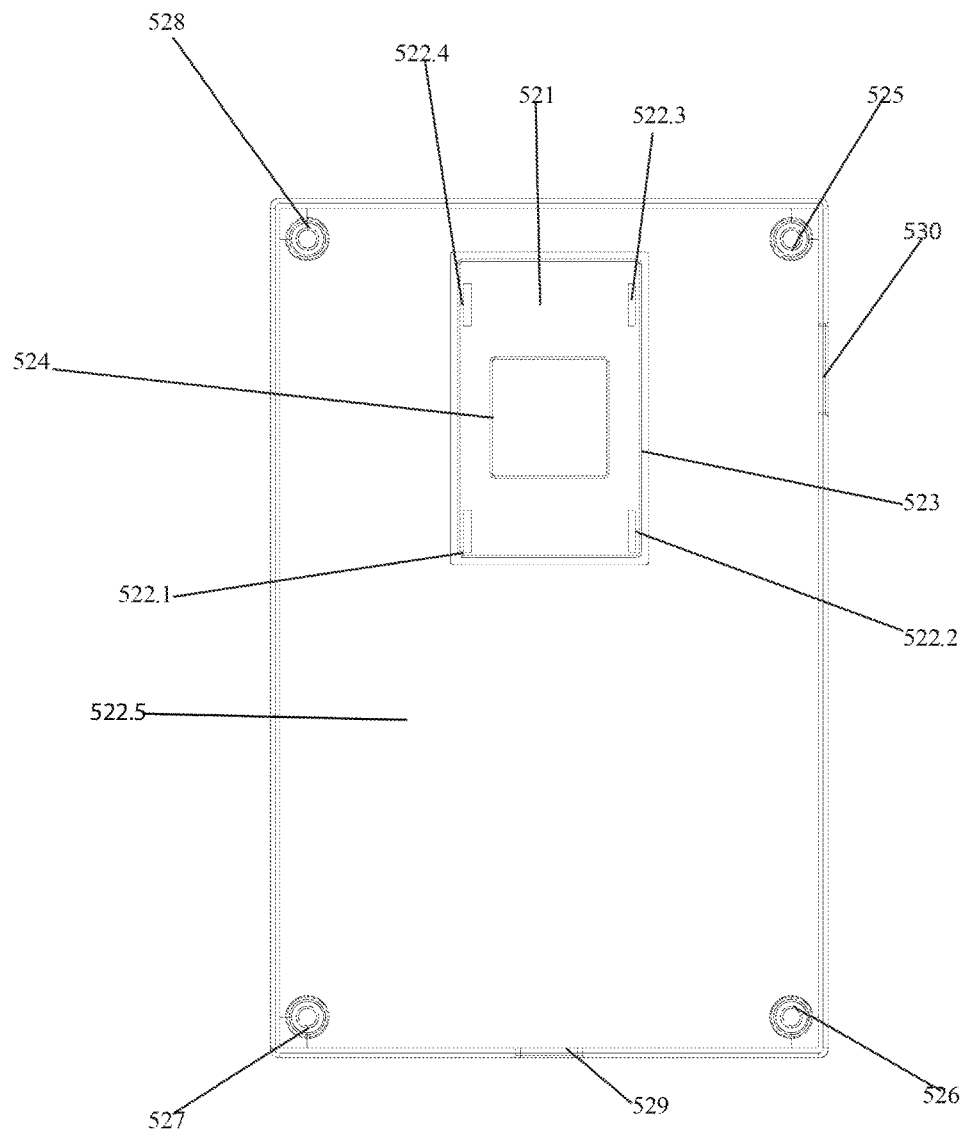

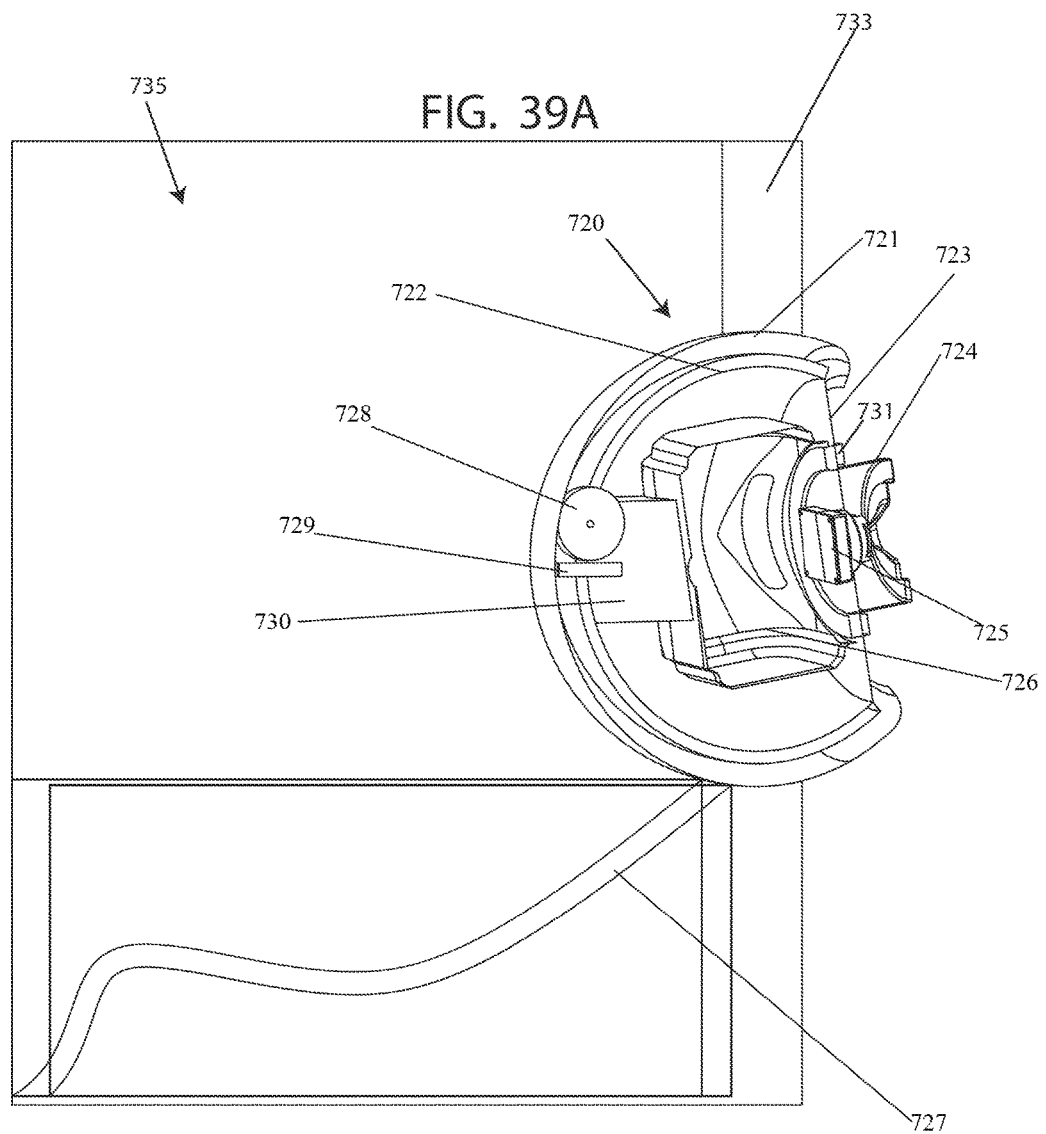

MOUNTING SYSTEM FOR A CAMERA

CROSS REFERENCE TO RELATED APPLICATIONS

This application is a non-provisional application that hereby claims priority to provisional patent application Ser. No. 62/091,346 filed on Dec. 12, 2014, and to provisional application Ser. No. 62/181,165, filed on Jun. 29, 2015 the disclosure of both of these applications are hereby incorporated herein by reference in their entirety.

BACKGROUND

The invention relates to a camera system for a door or entrance way wherein the camera system is configured to allow a user to view those standing in an entranceway in an improved manner.

SUMMARY

In at least one embodiment, there is an apparatus comprising: at least one mount; at least one electronic device configured to be coupled to the mount; at least one camera coupled to the electronic device and to the mount; wherein the at least one mount comprises at least one coupling element for coupling said at least one electronic device to said at least one mount and wherein the mount is configured to allow the electronic device to be mounted on a surface. The electronic device can comprise a screen or viewing display. The mount can comprise a body to receive or hold the electronic device. In one embodiment the mount comprises at least one adjustable arm. In one embodiment the adjustable arm comprises a ball and socket joint. In another embodiment the camera further comprises at least one lens assembly. In one embodiment the lens assembly and the mount further comprise a screw connection. In addition, in another embodiment, there is a connection bracket with prongs, which are configured to receive a display coupled to a camera.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 4A shows a top cross-sectional view of a door for receiving the device;

FIG. 4B shows the device coupled therein;

FIG. 4C shows the side cross-sectional view of the door;

FIG. 24A is a side view of another embodiment mounted on a door;

FIG. 24B is a side view of an electronic device;

FIG. 25 is a side view of a lens system;

FIG. 26A shows a view of a screen mounted on a door;

FIG. 26B shows a side view of an adjustable bracket for mounting on a door;

FIG. 27A shows a side view of another embodiment;

FIG. 27B shows a side view of the lens system; and

FIG. 34 is a back view of the housing bracket;

FIG. 39A is a side cross-sectional view of a camera for use with the screens or displays disclosed herein;

DETAILED DESCRIPTION

Figure 1:
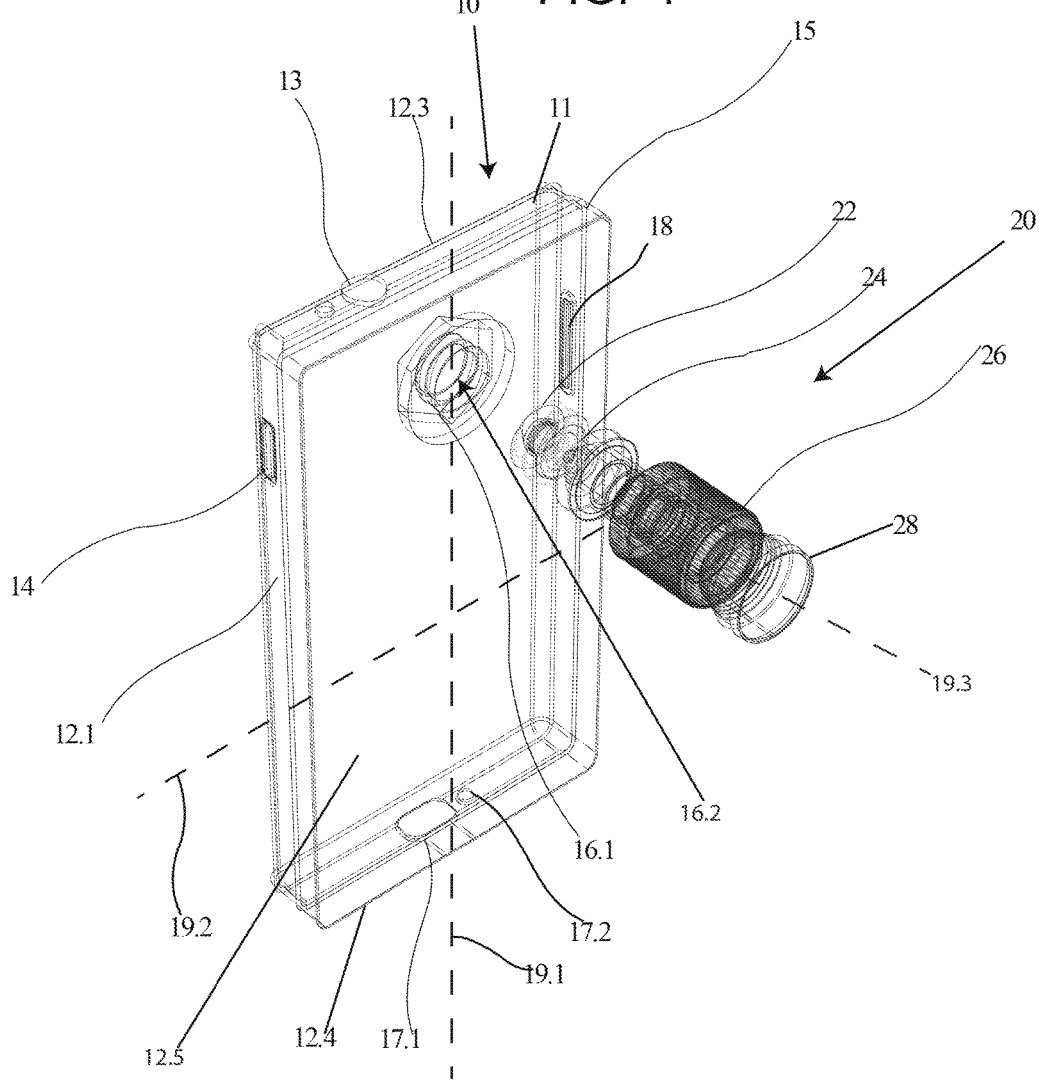
FIG. 1 shows a back perspective view of a first embodiment of the invention.

FIG. 1 shows a back perspective view of a first embodiment comprising a device 10. For example, there is shown a body 11 which includes a plurality of sides 12.1, 12.2, 12.3, and 12.4, as well as a back surface 12.5. Disposed at least one of these sides is a hole 13. Hole 13 is disposed on side 12.3. Sides 12.1 and 12.2 extend along a longitudinal axis 19.1. Sides 12.3 and 12.4 extend along latitudinal axis 19.2. Button 14 is disposed in side 12.1. Button 18 is disposed in side 12.2. Holes 17.1 and 17.2 are disposed in side 12.4. Back surface 12.5 bridges or extends between the different sides 12.1, 12.2, 12.3, and 12.4. Disposed in side or back surface 12.5 is a hole 16.2. Disposed in hole 16.2 is a gasket 16.1. Gasket 16.1 forms a screw receptacle for receiving a camera. In this view, longitudinal axis 19.1 extends along the length or longer dimension of the body while latitudinal axis extends along the width or shorter dimension. Camera 20 comprises a plurality of different components. For example, camera 20 includes a lens assembly comprising a first connection section 22, a lens section 24, an adjuster section 26, and an opposite end section 28 which can be frusto-conical in shape. Connection section 22 can be shaped as a spiral or threaded section which includes at least one spiral shaped or a plurality of spiral shaped threads which extend in a substantially helical manner to form a substantially solid connection end. Connection section 22 is configured to connect to gasket 16.1. As indicated above, gasket 16.1 forms a screw receptacle, which is essentially a threaded opening for receiving the connection section. Connection section 22 is therefore configured to be screwed into gasket 16.1. Alternative connection interfaces for connection section 22 and for gasket 16.1 are also available. For example, a snap-in connection is also available for a connection between camera 20 and body 11.

Figure 2:
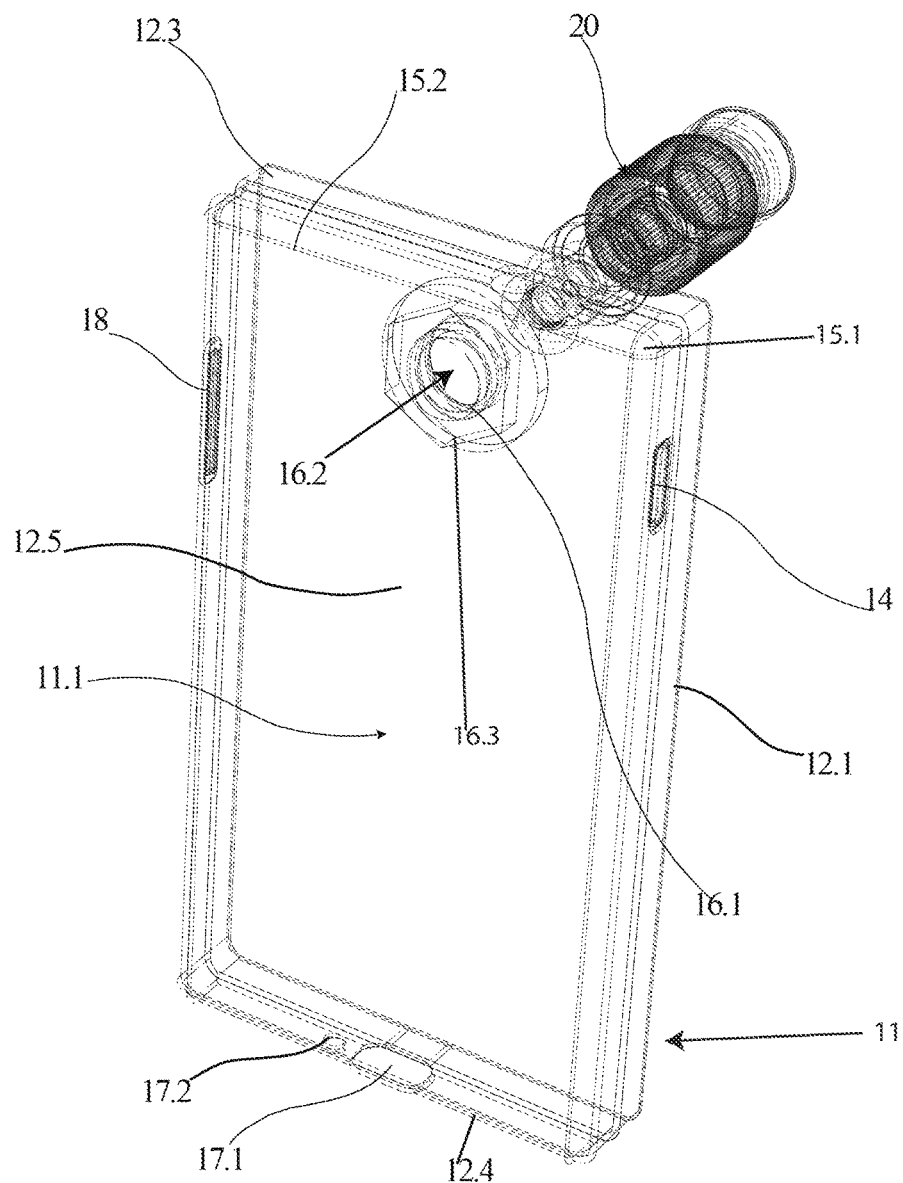
FIG. 2 shows an alternative view which is a front end perspective view without the screen.

FIG. 2 shows an alternative view which is a front end perspective view of the body 11 with the camera 20 being configured to connect to the body. This view shows gasket 16.1 which is fit into hole 16.2 which has threads 16.3. Camera 20 is configured to screw into gasket 16.1 such that threaded section 22 screws into threads 16.3.

This view also shows that side or back surface 12.5 along with sides 12.1, 12.2, 12.3, and 12.4 create a receptacle 11.1 for receiving a portable electronic device 21 (See FIG. 4A) such as a portable viewing screen, a portable camera system, or a portable mobile telephone. This receptacle 11.1 is configured to receive this electronic device with a snap-fit connection because sides 12.1, 12.2, 12.3, and 12.4 have a rounded corner connection 15.1 and rounded front ends 15.2. Rounded front ends 15.2 extend inward either substantially along longitudinal axis 19.1 or latitudinal axis 19.2 to create an at least partially enclosed housing for the electronic device. In at least one embodiment housing or body 11 is constructed from a flexible material such as plastic or rubber configured to bend or stretch to receive the electronic device. This bending or stretching allows the electronic device to be snapped into the housing or body 11 with a snug connection so that it holds the electronic device while still allowing for selective eventual removal of the electronic device.

Figure 3:
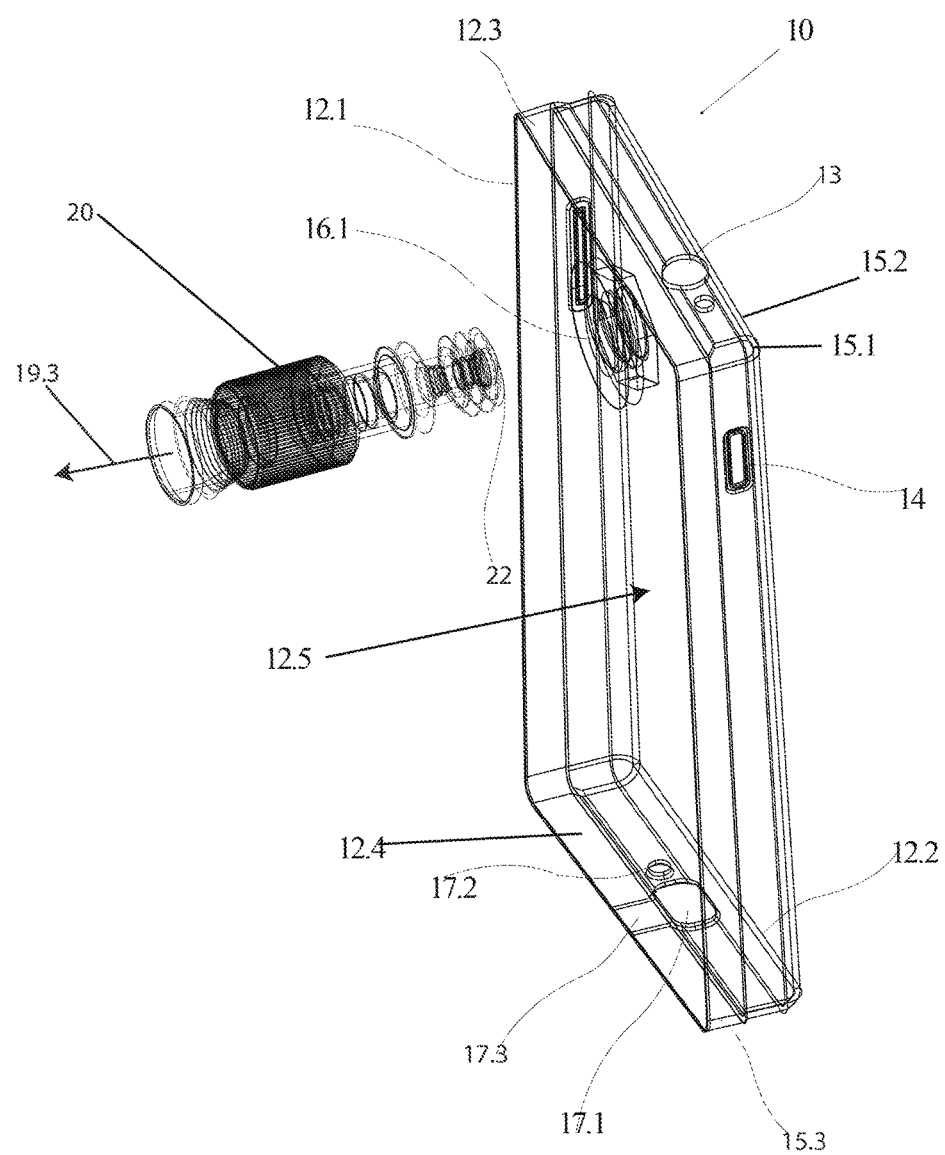
FIG. 3 is another back perspective view of the embodiment.

FIG. 3 is another back perspective view of the embodiment comprising a device 10. In this view, there are sides 12.1, 12.2, 12.3, 12.4, and back surface 12.5. Camera connection. 22 fits into gasket 16.1 along longitudinal axis 19.3. Holes 17.1, 17.2 and 17.3 are shown inside of side 12.4. Button 14 is shown inside 12.2 well. Button 18 is shown inside 12.1. Hole 13 is shown inside 12.3. Rounded edges 15.1 and rounded surface 15.2 are shown connecting the sides together.

FIG. 4A shows a top cross-sectional view of a door 118 for receiving the device while, FIG. 4B shows the device 10 coupled therein. For example, this 1 view shows the connection of the device 10 coupled to a door 118. Door 118 includes a hole 118.4, which allows camera 20 to slide therein. Axis 19.3 indicates an extension line for the extension of the camera 20 which extends through hole 118.4.

Door 118 can also include a hinge 118.1 a power line 118.2, and an optional electrical connector 118.3. Line 118.2 can be coupled through hinge 118.1. Thus, power from a wall feed can be fed into door 118 and then provided to an electrical component mounted on the door.

This view also shows that an electronic component such as a handheld device 21 can be pushed or moved along axis 19.5 into receptacle 11.1 to fit inside the housing or body 11. If the electronic component has an internal camera or receiver for receiving images this opening would be configured to line up to the lens/camera device 20.

FIG. 4B shows a top cross-sectional view of the door 118 with the device 10 all assembled in the door 118 with camera/lens 20 inserted into hole 118.4 (See FIG. 4A) and receptacle 11.1 ready to receive electronic device 21.

FIG. 4C shows the side cross-sectional view of the door 118. In addition, there is shown an embodiment of device 10, which includes receptacle 11.1 along with lens/camera 20. Lens/camera 20, is shown inserted into opening 118.4 (see FIG. 4a).

Figures 5A, 5B:
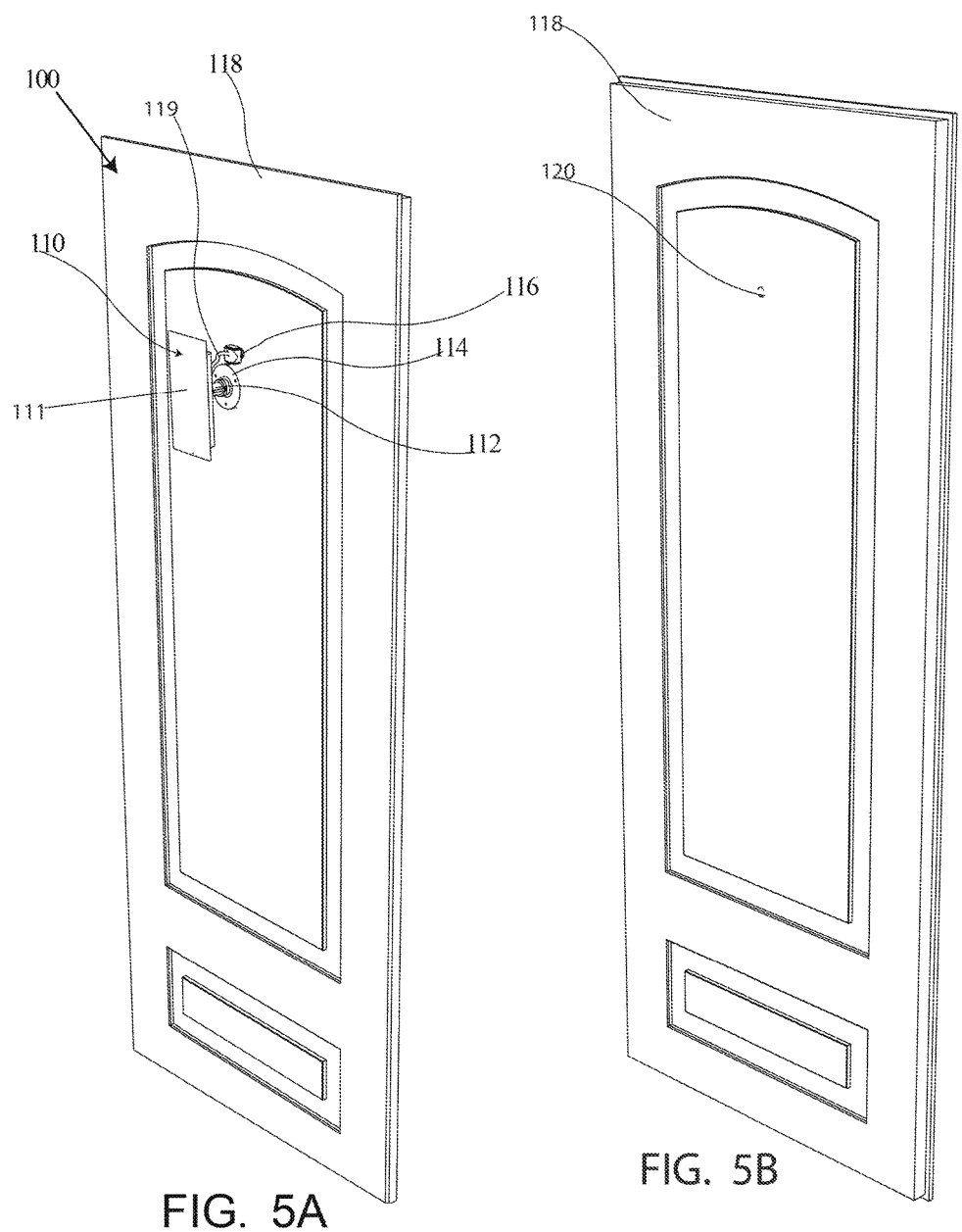
FIG. 5A shows a door with a different embodiment coupled thereto.
FIG. 5B shows the opposite side of door 118, which includes eyehole 120.

FIG. 5A shows a door 118 with a different embodiment 110 coupled thereto. Embodiment 110 includes a base 114 coupled to the door 118. In addition, there is a cable 119, which is coupled to a camera 116. A screen 111 is shown facing substantially parallel to door 118. Screen 111 is mounted on an arm 112 which is coupled to base 114.

FIG. 5B shows the opposite side of door 118, which includes eyehole 120. Eyehole 120 allows camera 116 access to the other side of door 118. In this way, users who are standing on this side of the door, can be seen by camera 116.

With this design, as with the other designs, the camera 116 and the screen 111, can be separate from each other with the camera and the screen being powered separately from each other. In addition, with this design, the camera and the screen, or other device can communicate wirelessly with each other.

Figure 6:
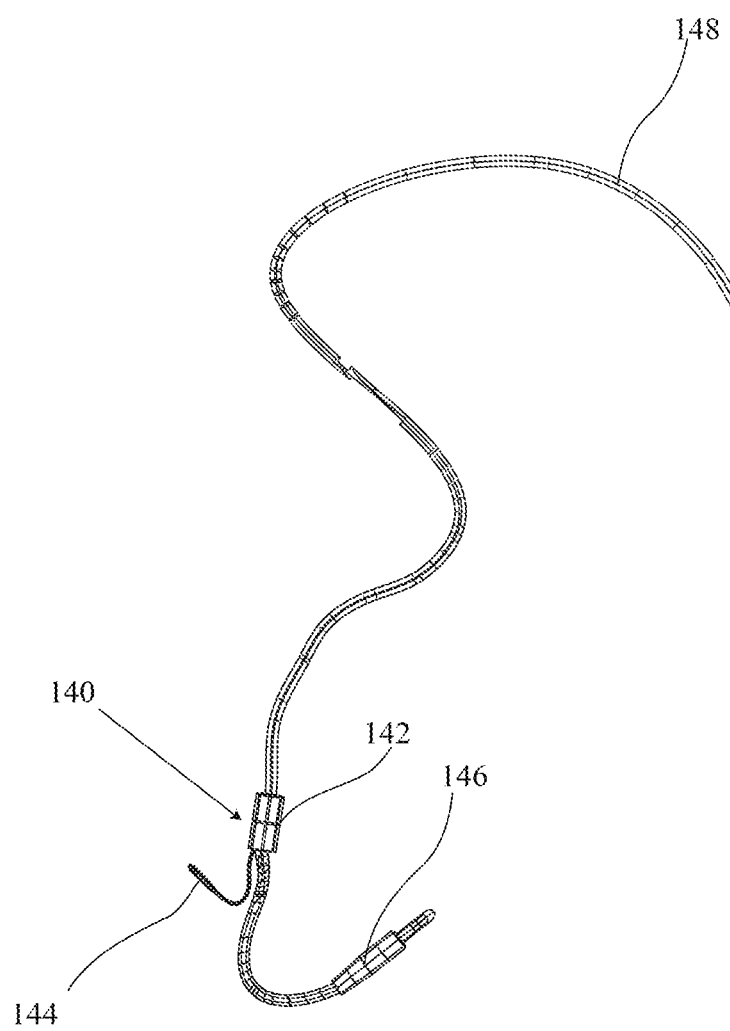
FIG. 6 is a view of a cable.

FIG. 6 is a view of a cable 140. This cable 140, can be used in place of cable 119. Cable 140 includes a coupling or grommet section 142. Extending off of coupling or grommet section 142 is a pigtail comprising a Wifi antenna 144, and a cable section 146. Thus, this wifi antenna 144 can be used to allow the camera to communicate wirelessly with other devices. Extending out of the opposite end of grommet 142, is an end of the cable 148. Cable 148, can be coupled to a power cable, as well as have a data feed. Alternatively, pigtail 144 can be configured as a data feed cable that is separable from a power cable 146. In that way, electronic device, such as electronic device 21, or electronic device 110, or electronic device 150 can be coupled to a cable such as cable 119, or cable 140.

Figure 7:
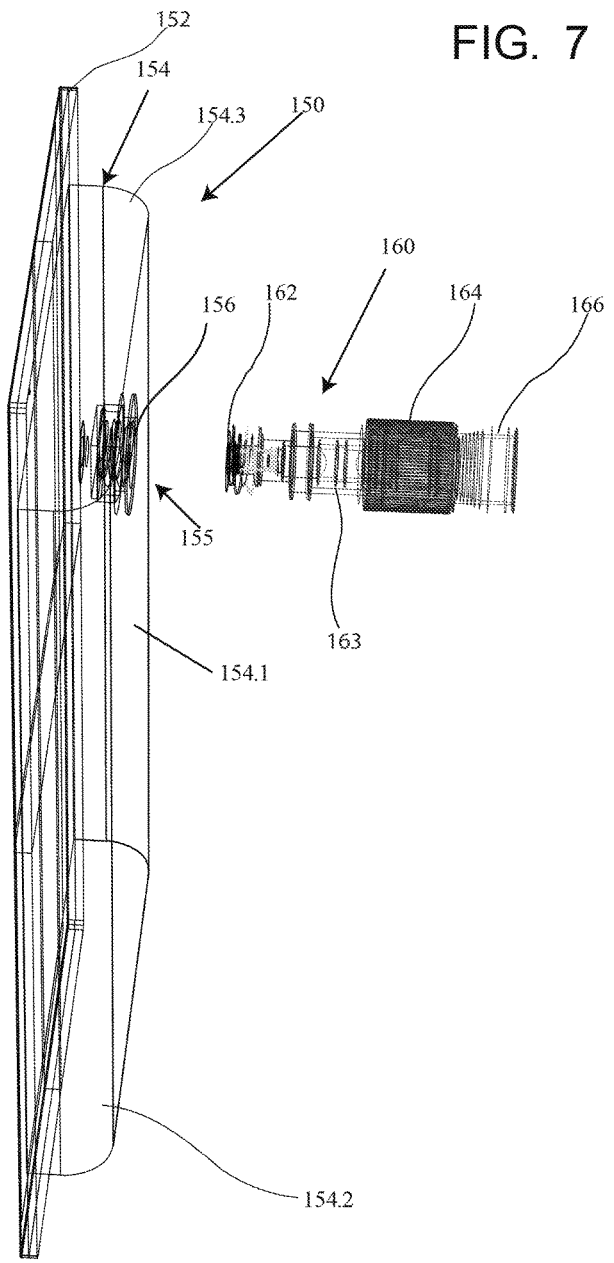
FIG. 7 is a perspective view of another embodiment which is an integrated electronic device.

FIG. 7 is a perspective view of another embodiment 150 which is an integrated electronic device. Integrated electronic device 150 includes a screen 152, as well as a body section 154. Body section 154 includes faces 154.1, 154.2, 154.3 (See FIG. 8). Body section 154, is configured to house a set electronic components which can include, screen controls for screen 152, as well as camera controls for camera/lens 160. In addition, embedded in housing or body section 154 is a grommet or receptacle 156 which fits into hole 155. This receptacle can be a threaded or a screw receptacle which is configured to receive a screw in connection such as connection 162 from the camera or lens. Receptacle 156 includes an opening 155 for receiving the screwing connection 162. Connection end 162 is a threaded connection for screwing into grommet or receptacle 156.

Camera/lens 160 includes a lens section 163, a focus in section 164, which allows the user to focus the lens, and an aperture opening 166. Camera/lens 160 can be screwed into receptacle 156 in a secure type connection such that it is configured to support body 154 as well as screen 152 when camera/lens 160 is secured to a door.

Figure 8:
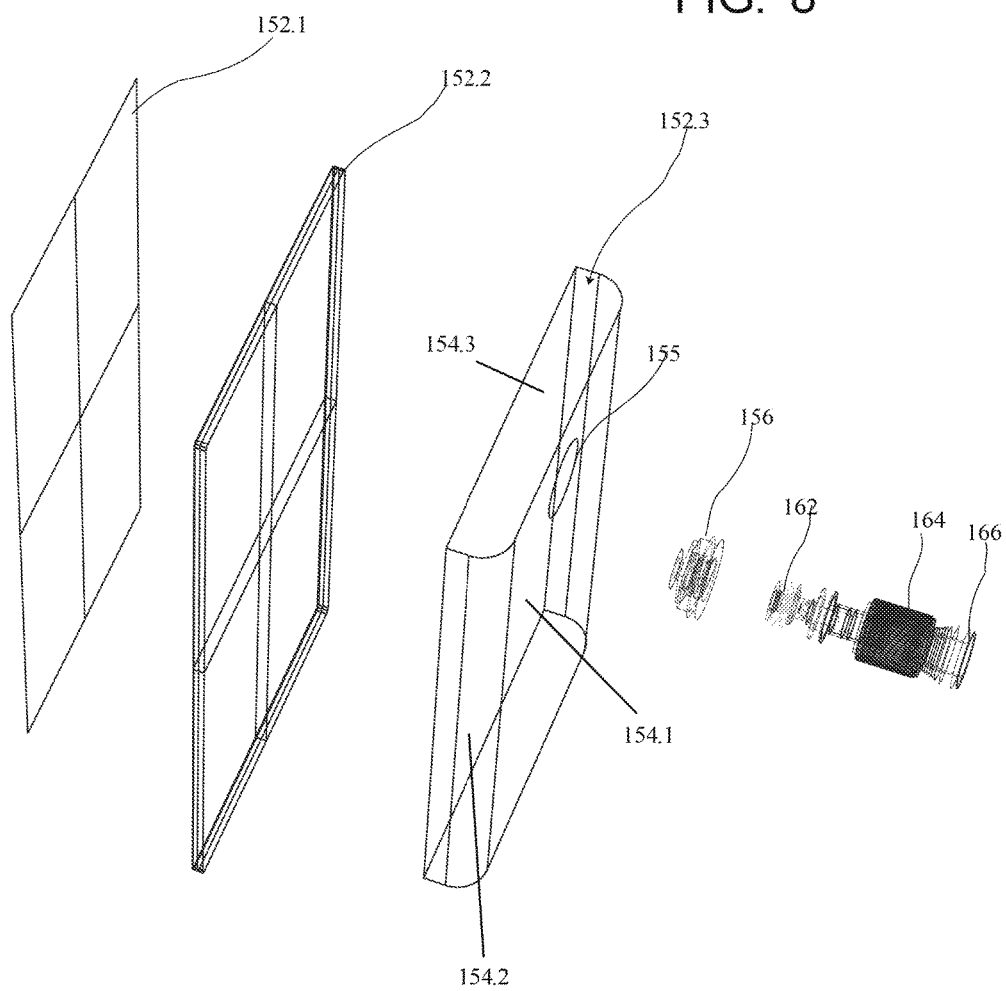
FIG. 8 is an exploded view of the device shown in FIG. 7.

FIG. 8 is an exploded view of the device shown in FIG. 7. For example, there is a multilayer screen section 152.1 and 152.2, which comprises a front panel 152.1 and a pixel section 152.2. Section 152.3 is the base or body section for the electronic device which can fit all the additional electronic components for controlling both the screen as well as camera. Sides 134.1, 154.2, and 154.3 are also shown. In addition, opening 155 is shown in configured to receive grommet or receptacle 156.

Figure 9:
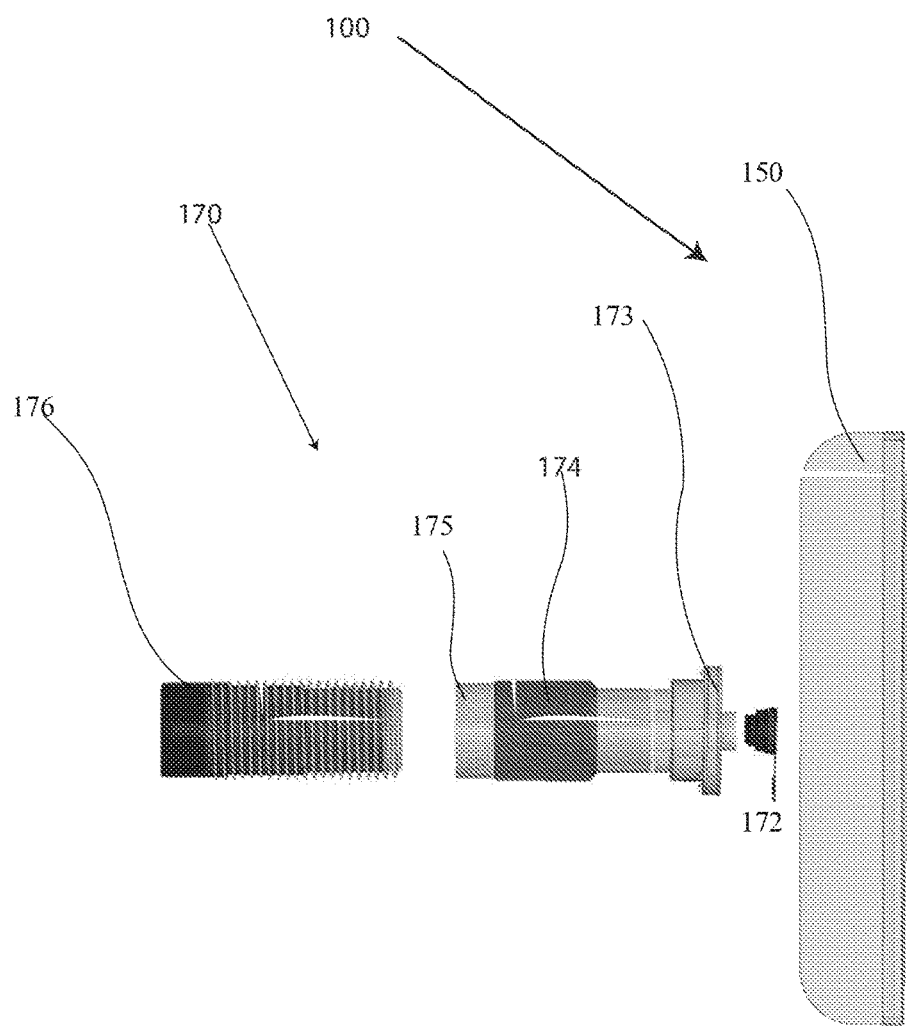
FIG. 9 is a side view of another embodiment of the camera coupled to electronic device.

FIG. 9 is a side view of another embodiment of the camera 170 coupled to electronic device 100. Camera 170 includes and a rotatable lens 172 for coupling to electronic device 150, and a connection end 173 for connecting to lens 172. There is also lens housing 174, an end 175 to lens housing, and an extension end 176. For the remaining part of the camera, extension 176 is threaded so that then it is rotated it allows for adjustment for optical focusing.

Figure 10:
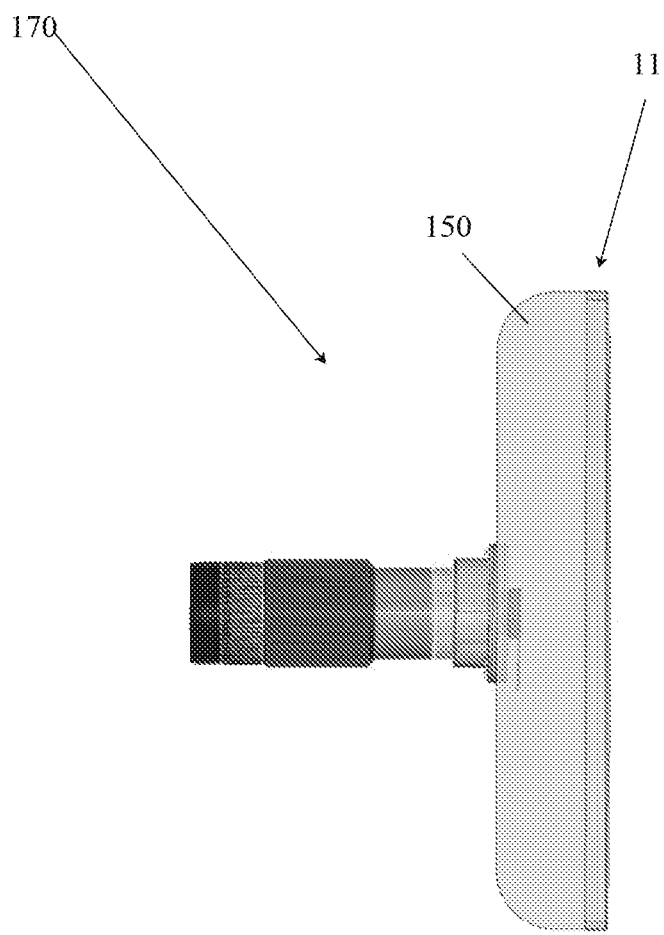
FIG. 10 shows camera section coupled to embodiment of the electronic device.

FIG. 10 shows camera section 170, coupled to embodiment 150 of the electronic device. In addition, camera/lens 170 can also be coupled to the embodiment, which includes body 11, in the alternative.

Figure 11:
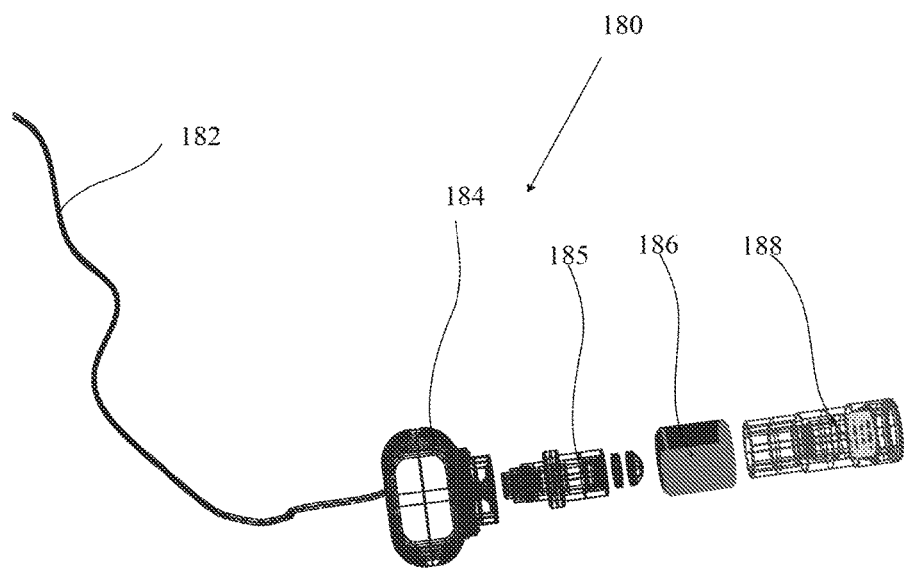
FIG. 11 is another embodiment of another camera which can be separate from the screen element.

FIG. 11 is another embodiment of another camera which can be separate from the screen element. For example, this camera 180 includes a cable 182, the camera body 184, a lens section 185, a focal adjuster 186, and a lens section 188. This camera, as indicated is separate from the electronic screen but is coupled to the electronic screen via cable 182.

Figure 12:
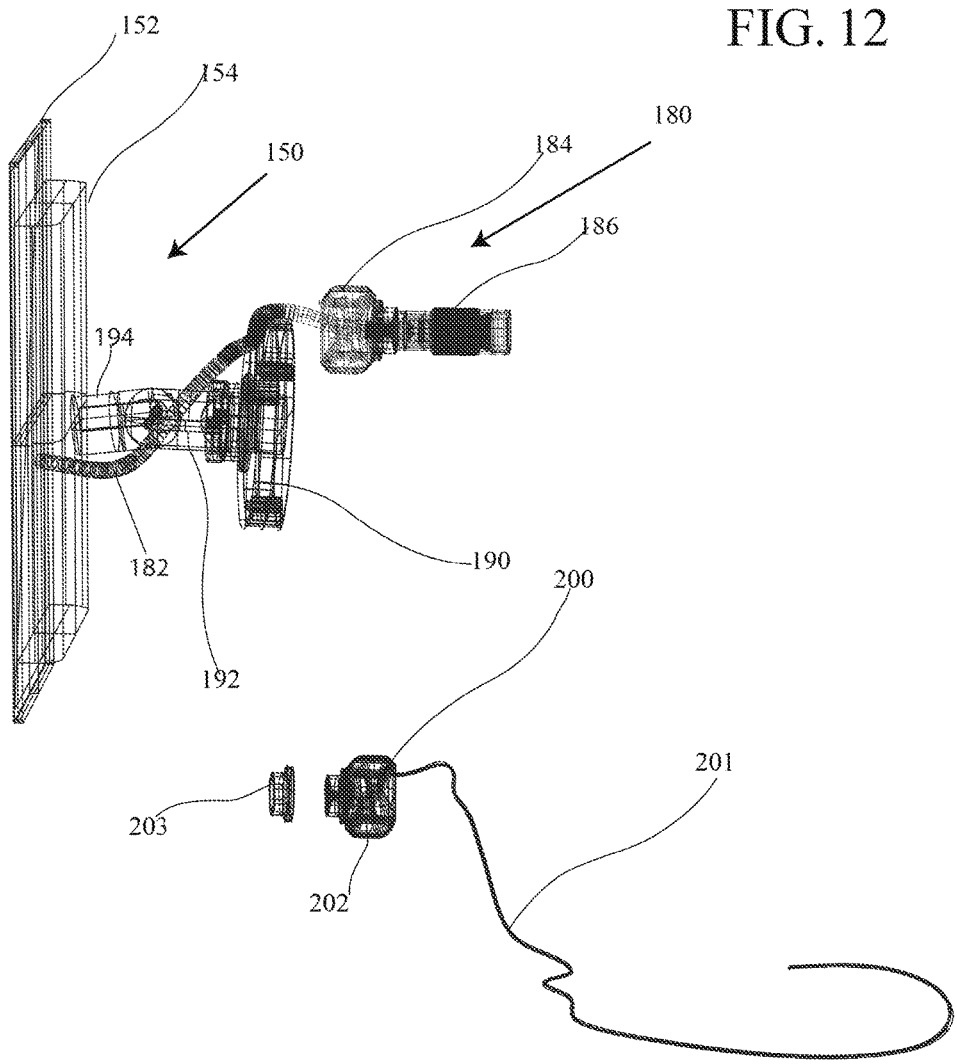
FIG. 12 is a side view of the electronic device.

FIG. 12 is a side view of the electronic device 150. Electronic device 115 includes screen 152 and body 154. Coupled body 154 is second arm 194. Coupled the second arm 194 is first arm 192. First arm 192 is coupled to base 190. Base 190 is configured to be coupled to a door such as door 118. Base 190 can be coupled to a door via any known manner such as through an adhesive, screws, or any other known coupling means. Coupled to body section 154 is a cable 182. Cable 182 is part of camera 180. Camera 180 includes a base section 184, and a focal adjuster 186.

Alternatively, another type of camera 200 is shown. This camera 200 can be used instead of camera 180. This camera includes a cable 201, a body section 202, and lens cover section 203. This camera is substantially smaller camera and can be coupled directly to a keyhole or an eyelet of the door, in a more compact manner.

Figure 13:
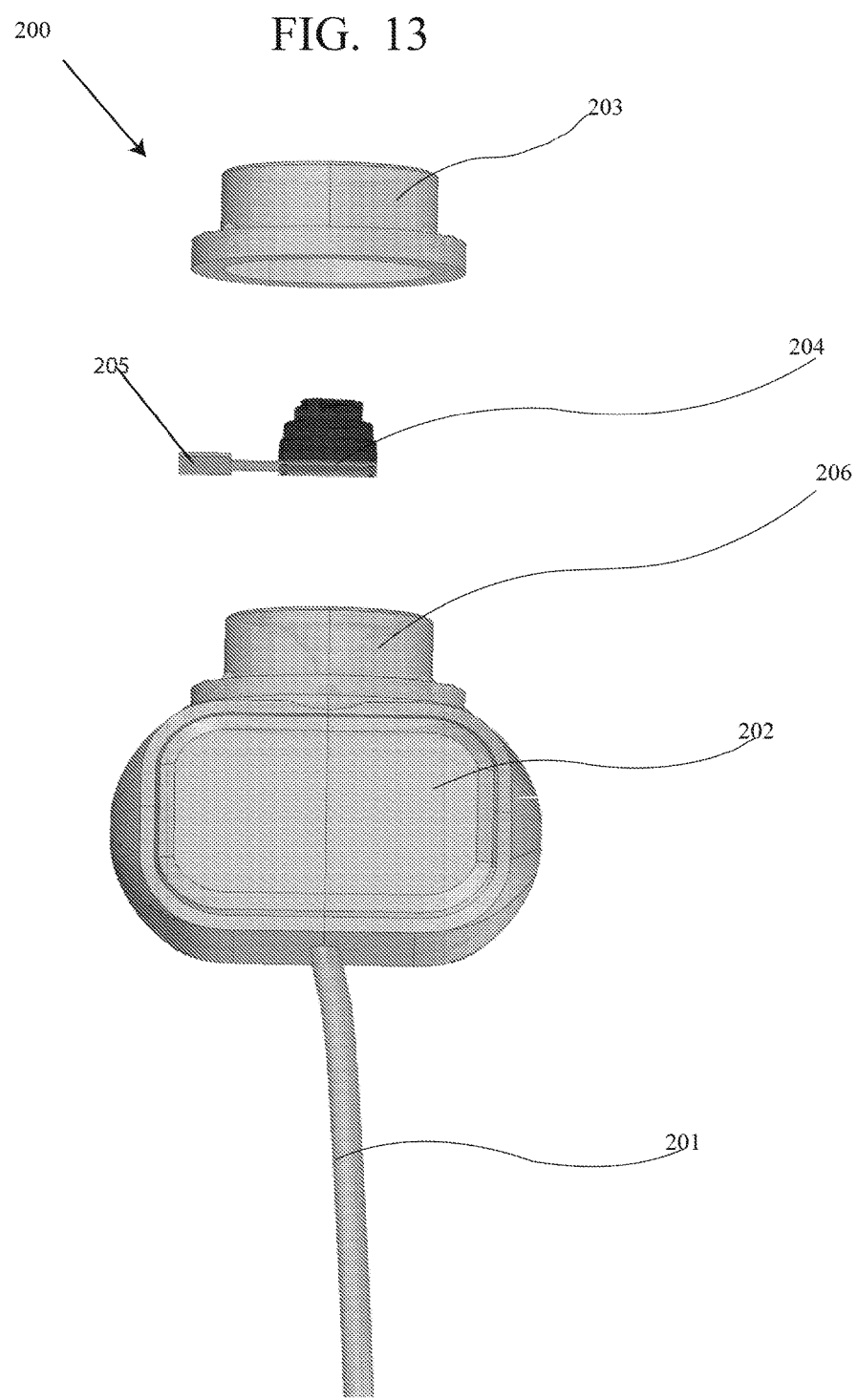
FIG. 13 shows an exploded view of another camera device.

For example, as shown in FIG. 13 camera 200 includes body section 202, cable 201, lens 204, and lens cover, 203. There is also a lens seat, 206 which is configured to receive lens 204. Lens 204 also includes an adjusting arm 205, which allows for the focusing or focal adjustment of lens 204.

Figure 14:
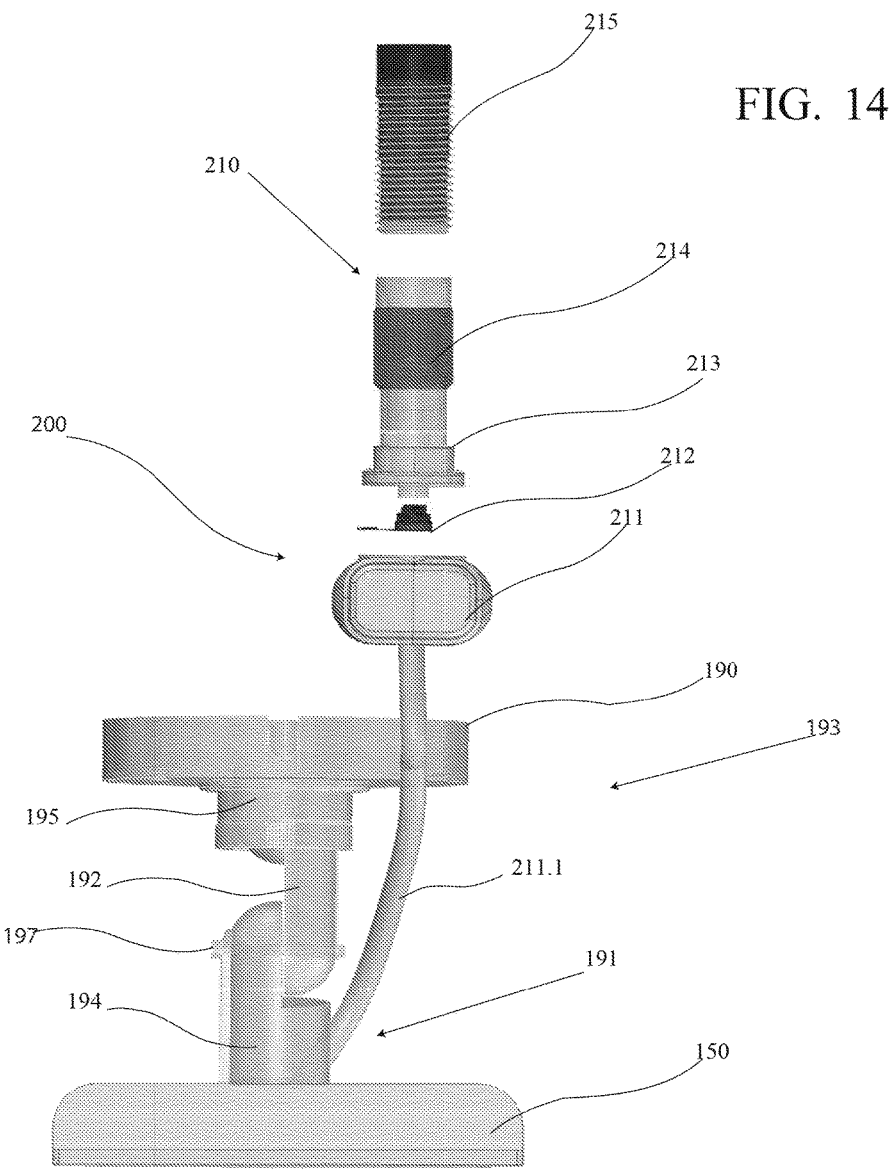
FIG. 14 shows an exploded view of the camera.

FIG. 14 shows another embodiment which shows an exploded view of the camera 210, camera 210 includes a body section 211, a lens 212, a lens seat 213, a focal adjuster 214, and a lens extension 215. Camera body 211 is coupled to a cable 211.1, which is coupled to electronic device, such as electronic device 150.

Also shown, in this view is coupling element 193 which includes base 190, and back adjustment section 191 which includes first arm 192, and second arm 194. There is also shown pivot 197 which is coupled to both first arm 192 and second arm 194.

Figure 15:
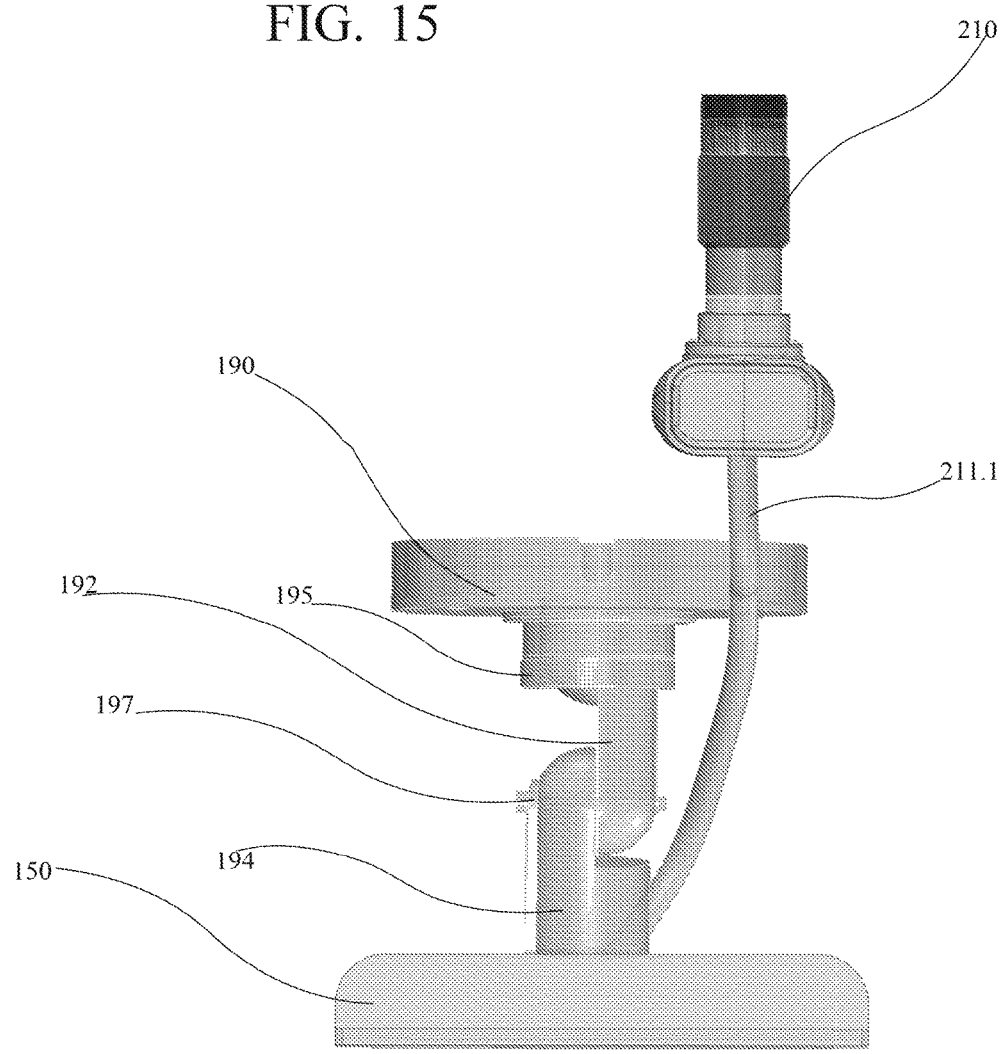
FIG. 15 shows a view of camera assembled.

FIG. 15 shows a view of camera 210 assembled. In addition, this view also 22 shows a rotatable pivot joint 195, which allows for adjustment the ball joint 196. Ball joint 196 is coupled to first arm 192 which is coupled pivot joint 197 (See FIG. 17). As disclosed above pivot joint 197 is coupled to a second arm 194, which is coupled to the electronic device 150.

Figure 16:
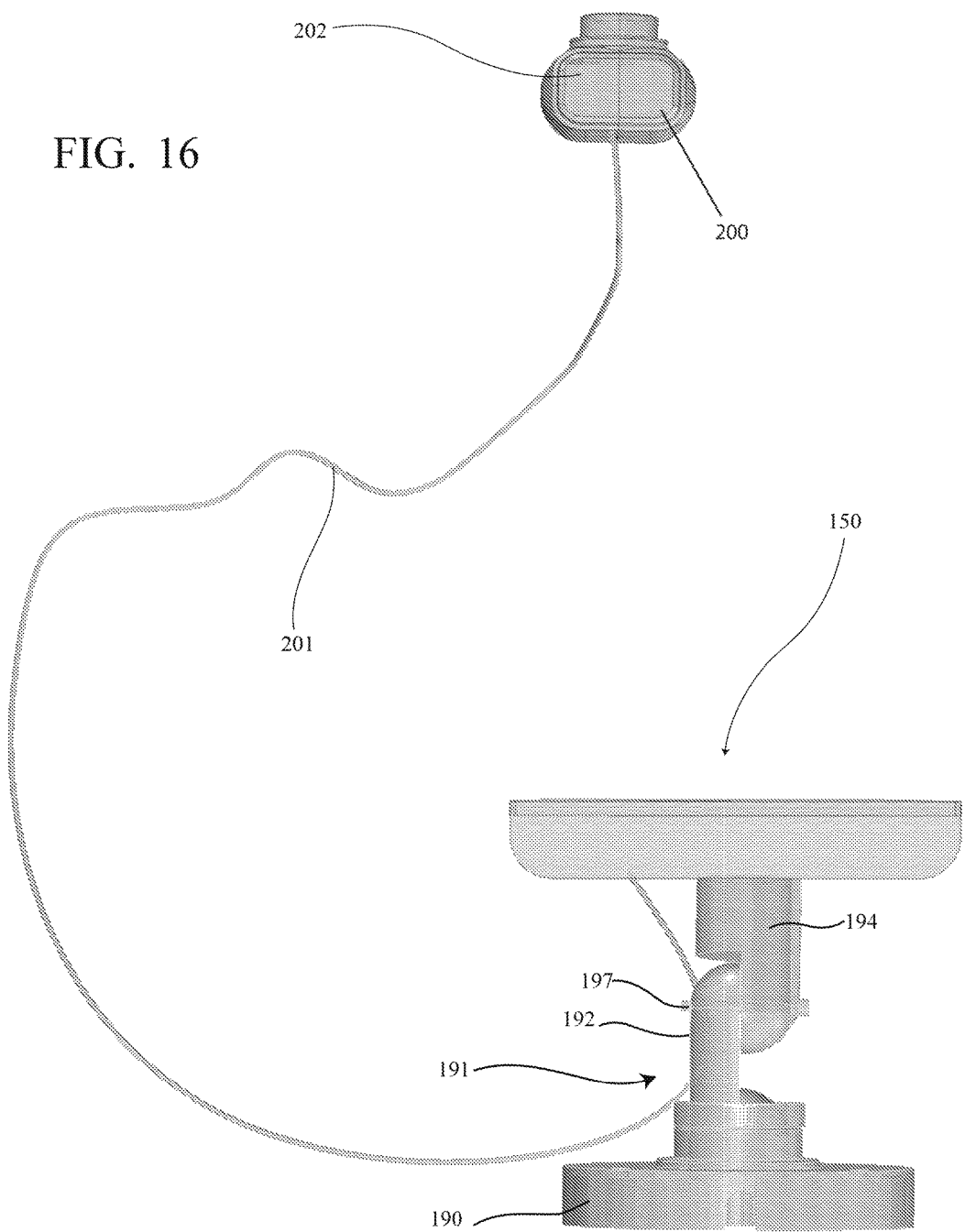
FIG. 16 shows a side view of the camera of FIG. 13 coupled to a device.

FIG. 16 shows a view of camera 200, including camera body 202, camera cable 201, coupled to electronic assembly 150 which can also be coupled to arm assembly 191.

Figure 17:
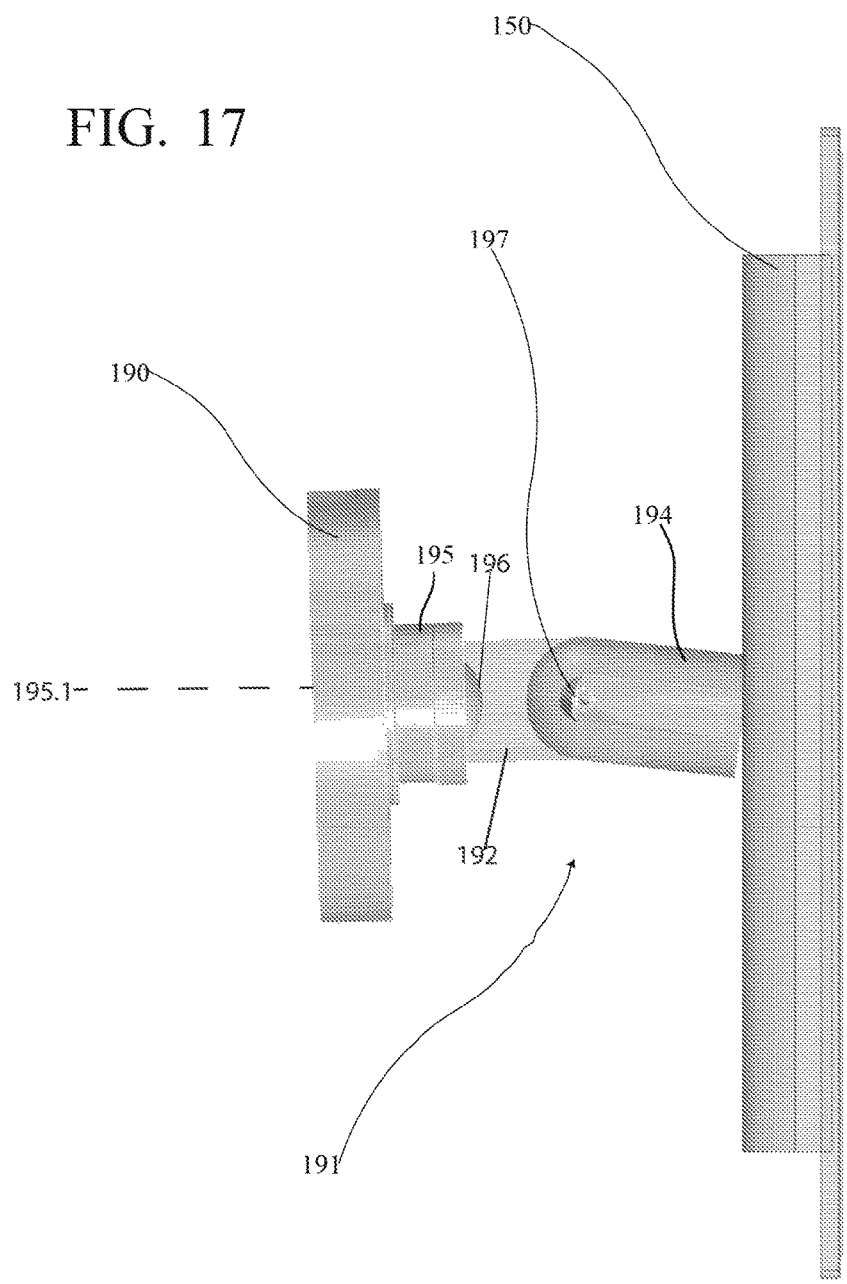
FIG. 17 shows a side view of a coupling element.

FIG. 17 is a side view of arm assembly 191 coupled to electronic device 150. As disclosed above, arm assembly 191, includes a first arm 192, a second arm 194, a pivot joint 197, a rotatable pivot joint 195, and a ball joint 196. Rotatable pivot joint 195, is rotatable about an axis 195.1 which can selectively secure rotation via the ball joint 196. In addition, pivot joint 197, can be selectively tightened as well. Thus, with this design arm assembly 191 allows for a near universal or universally adjustable joint for selectively orientating electronic device 150. Ball joint 196 allows for virtually omnidirectional movement between base 190 and device 150. Thus, this arm assembly 191 allows for users to view screen associate electronic device 150 at nearly any selected angle and at different elevations as well.

Figure 18:
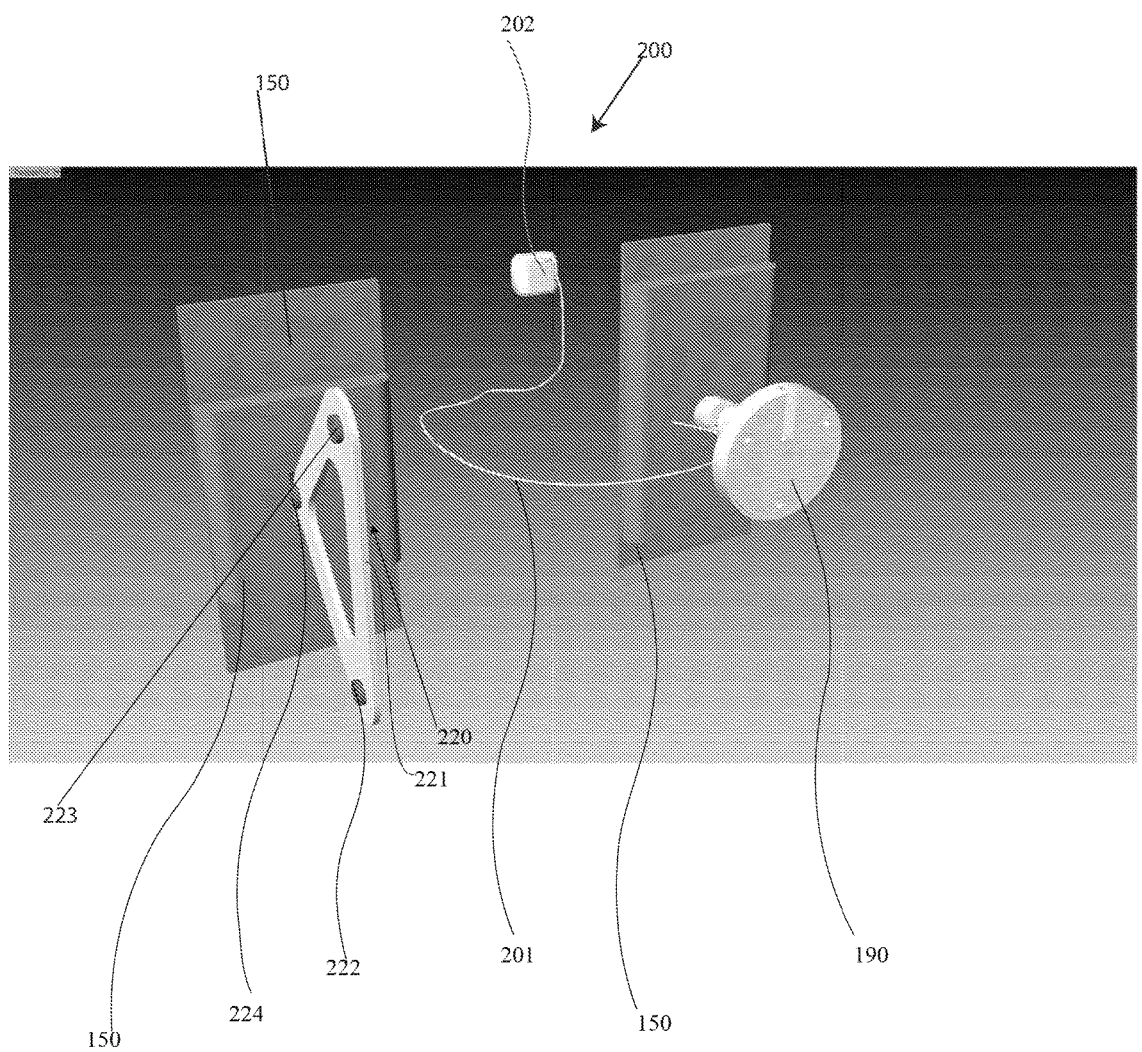
FIG. 18 shows a back perspective view of two different embodiments.

FIG. 18 discloses two different embodiments, which include a first embodiment, which includes electronic device 150 which is coupled to an adjustable arm 220. Adjustable arm 220 comprises an arm section which is a substantially triangular arm section.

Substantially triangular arm section has a plurality of pivot joints including pivot joints 22 224, 222, and 223. Pivot connection 224, allows for rotational adjustment of the electronic device 150 relative to arm 220. Pivot joints 223 into 22 allow for coupling to a different connection such as to a door or other type mechanism which allow for rotation about either of these connection joints.

The other embodiment includes camera 200, including camera body 202, along with cable 201 coupled to electronic device 150. Electronic device 150 is coupled to coupling element 193, (See FIG. 14) including base 190. This figure shows that electronic device 150 can be coupled to multiple different types of coupling arms which can then be coupled to a selected door such as door 118.

Figure 19:
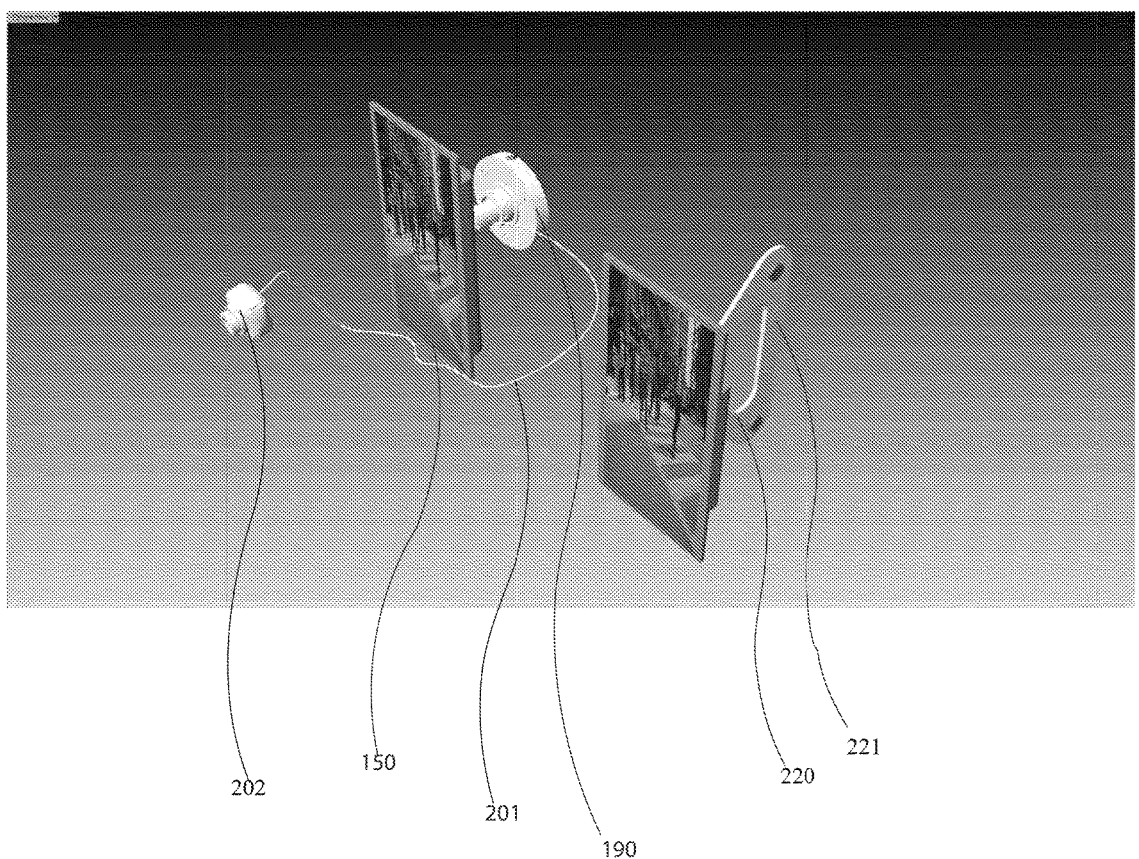
FIG. 19 shows a front perspective view of the embodiment shown in FIG. 18.

FIG. 19 shows a front view of the view shown in FIG. 18. In this view, there is shown camera body 202, electronic device 150 which shows a screen, cable 201, as well as coupling arm 220 coupled to another electronic device 150 wherein coupling arm 220 includes pivot arm 221.

Figure 20:
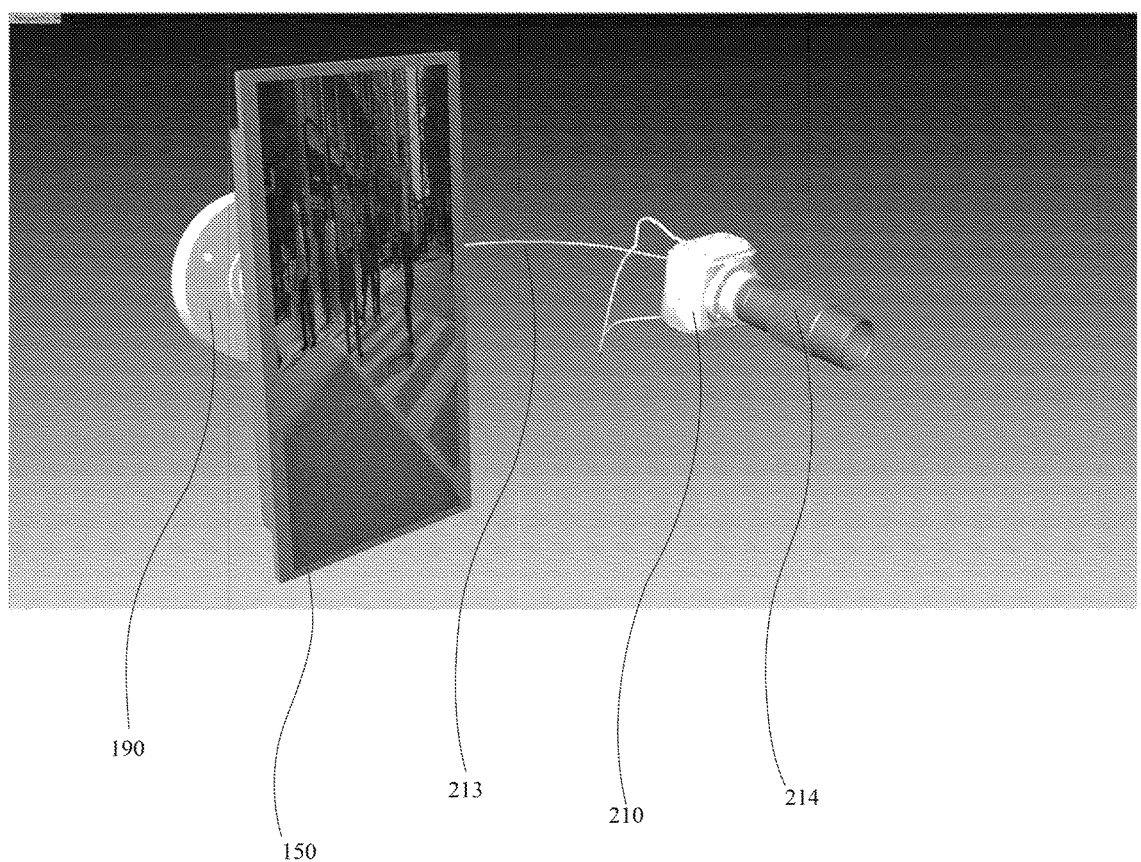
FIG. 20 shows a front perspective view of at least one other embodiment.

FIG. 20 discloses another embodiment, which includes base 190, associated with camera arm 193 electronic assembly 150, cable 213, camera assembly 210, which includes the associated lenses and focal adjuster 214.

Figure 21:
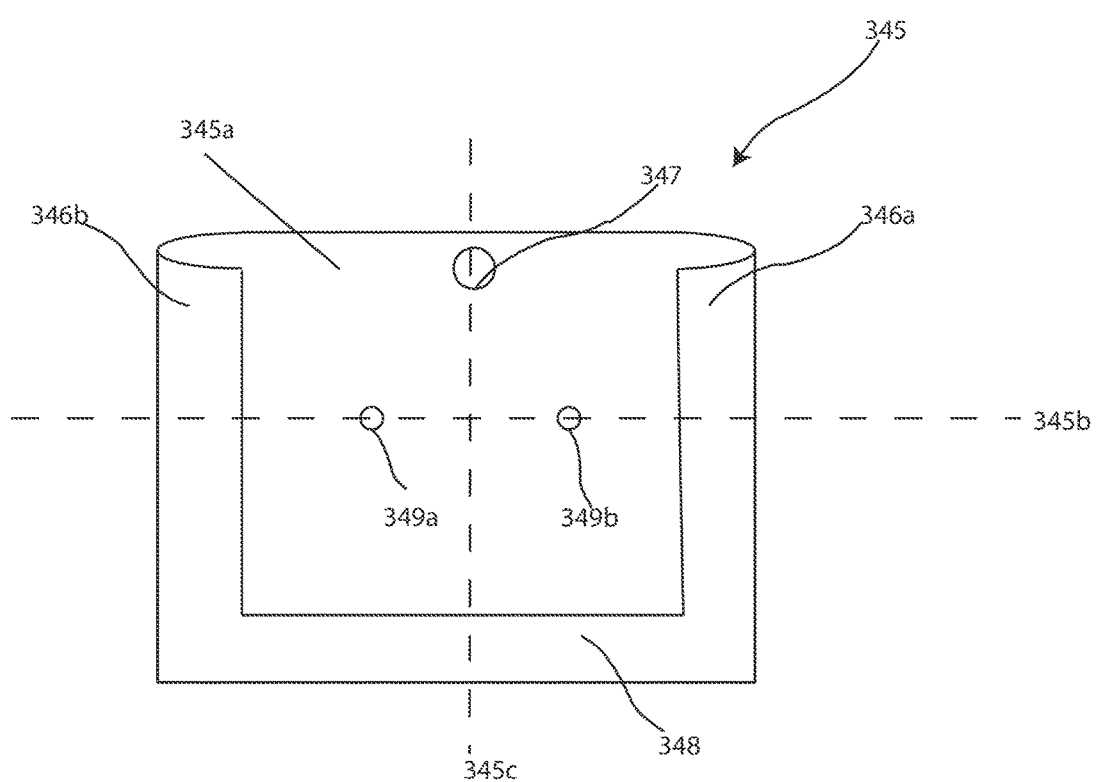
FIG. 21 is a back view of an alternative bracket.

FIG. 21 is a view of another embodiment of a frame for holding the camera and screen assembly for use with a wall or a door. In this embodiment, there is shown a body section 345a. A hole 347 is positioned in body section 345a to allow a camera to shine through the hole. In addition there are wings 346a and 346b which can be formed using curves to allow a device such as a screen/camera combination to fit therein. In addition there are attachment elements such as attachment elements 349a and 349b which are coupled to the body section 345a. Wings 346a and 346b form channels that extend along longitudinal axis 345b and are disposed on either side of this longitudinal axis 345b. In addition a latitudinal axis 345c extends along the width of the frame. A bottom section 348 also forms a catch or a channel much like the channels formed by wings 346a and 346b. This device is then configured to hold a combination screen and camera device such as a portable smart phone or a portable tablet.

Figure 22:
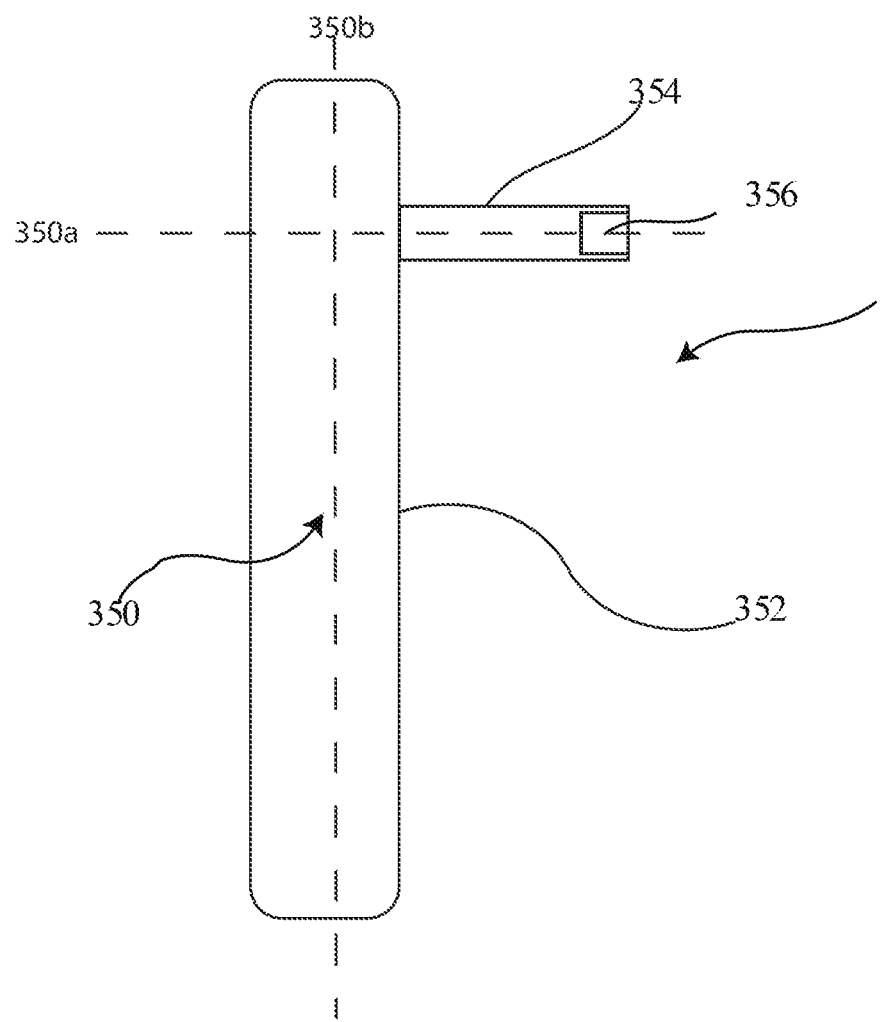
FIG. 22 is a side view of an electronic device.

FIG. 22 is a view of a first embodiment device 355 of a camera 356 and screen assembly 350. This type of assembly includes a screen body 352 which in this embodiment is shown from a side view. The screen body 352 extends along a longitudinal axis 350b and also along a latitudinal axis 350a. In addition, a camera shaft 354 is coupled to one side of the camera body 352. This camera shaft 354 serves as an extension extending the connection of a camera 356 to the screen body. The connection between the camera 356 and the screen body 352 can be either through a wired connection extending along shaft 354 or through a wireless connection communicating with the screen body. In this embodiment the extension of the screen body 352 along the longitudinal axis 350b is longer than the depth of the screen body 352 extending along the latitudinal axis 350a.

Figure 23:
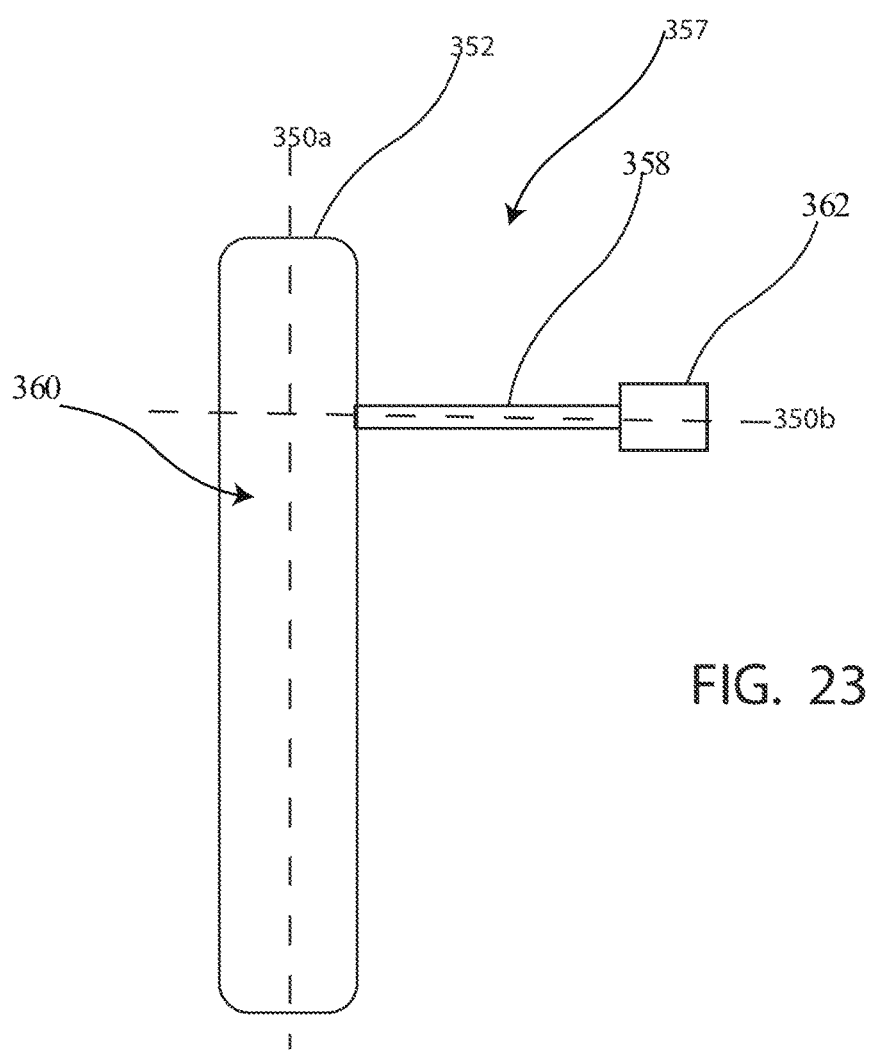
FIG. 23 is a side view of an alternative electronic device.

FIG. 23 is a view of another embodiment of a screen assembly 360 of a camera frame and assembly. In this embodiment there is a screen body 352 which is connected to a cable 358 which is coupled to a camera 362 at another end of the cable. In this embodiment, the camera is not fixed in a shaft, but rather free to be fixed to another environment. The cable 358 is at least in one embodiment flexible and movable so that the camera 362 can be positioned in different positioned on a wall. This cable 358 and camera 362 assembly can fit inside shaft 354 as well.

FIG. 24A is a view of the camera and frame and assembly coupled to a door. For example, the embodiment shown discloses a door 420 which extends along a longitudinal axis 420a and along a latitudinal axis 420c. Longitudinal axis 420a extends along the length of the door while latitudinal axis 420c extends along the depth of the door. A hole 421 is formed in the door which allows the camera or shaft to be positioned therein.

FIG. 24B shows a side view of a device which is a combination of a camera and a screen. In this view there is a screen device 355 and a camera 353 attached to the screen device. This type of device is used with the embodiment of FIG. 25.

FIG. 25 is a view of the scope 430 for use with the embodiment shown in FIG. 25A. This scope 430 is shown so that it can be positioned adjacent to or attached to a camera portion of a camera/display module such as that shown in FIG. 25C. Other examples of camera/display modules are shown as well in FIGS. 24A 1 and 24B. In this view, there is shown a scope 430 which includes an eyepiece or oculus 426 which is shown coupled to a camera piece 353. A flange 428 extends out from a body section as well. While the eyepiece or oculus 426 is shown as frusto-conical in shape it could be in any suitable shape. One or more lenses 431 and/or 434 are disposed inside of this tube body 432. These lenses are used to refract the image so that the image from the camera 353 is not distorted when entering or leaving the opening 440. In addition, and if necessary, mirrors or reflective surfaces 435 are present in the inside walls of the tube 432 to further reflect the light and to focus the image inside the tube 432 so that the image continues to extend down the tube. An additional flange 438 is disposed opposite to flange 428. A dividing line 433 indicates that the device can be telescoping in length depending on the depth of the door. Each end can therefore be separated so that each end can be put in at each side of the door. The flanges 428 and 438 can be used to secure this device to each respective side of the door.

Because each end is bounded by a flange, the flanges 428 and 438 can be individually secured to the door via screws or other fastening devices and then the device can be slid together inside of the door such that one end telescopes inside of the other inside of the door. Alternatively, the device can be slid into the door first as one piece and then the flanges can be attached after the device is slide inside of the door.

FIG. 26A shows the embodiment shown in FIGS. 23A, 23B, 24A, 24B, and 25 coupled to a door 420. In this view there is a frame 370 which is used to couple a device/screen assembly 350 or 360 to the frame 370. The frame 370 is configured to be adjustable in height and width so that it can fit any suitable type screen assembly of any suitable size. The adjustability of this type of frame is based upon the frame being telescoping in at least one direction such as either in a width or latitudinal axis dimension along axis 420b or along a length or longitudinal axis 420a.

While the frame shown in FIG. 23 is one example the frame shown in FIG. 26B is another example showing a frame that is telescoping with a first base 371, a second section or piece 372 coupled to base 371 and slidable along this base. There is a third piece 373 which is slidable vs piece 372. Second section or piece 172 is slidable vs. first section 371 along the longitudinal axis 420a, while third section or piece is slidable vs. the second section or piece 372 along the latitudinal axis 420b.

FIG. 27A is a side view of the screen assembly 350 and 360 mounted on the door 420. Frame 370 is shown mounted on the door and holding the screen assembly 350 and 360. Camera 362 or 356 scope 430 is shown extending out on the other side of the door 420. As shown in this view there is a hole 421 cut in the door which allows for cables or for the camera to extend there-through.

FIG. 27B shows a plug 500 which is in the form of a hollow cylinder which can be inserted through a door. The plug 500 can be inserted into a hole in the door and be used to feed a line or cable such as cable 358 there-through. In addition, a camera such as any one of cameras 356, 362, or scope 430 is configured to fit into eye piece 303 and be secured therein. On the opposite end, eyepiece 502 is configured to receive the cable from the screen. These eyepieces 502 and 503 can be made from any suitable material such as rubber, plastic, metal or composite. The body of the plug 500 is made from a cylinder 504 which is coupled at one end to eyepiece 502 and at the other end to eyepiece 503. This body extends along a longitudinal axis 501 from eyepiece 502 to eyepiece 503. These eyepieces 502 and 503 can be attached after cylindrical body 504 is slid through a hole either in a door or a body of an object such as the frame of a motor vehicle, a boat or an airplane. While the body 504 is shown as a cylinder, other shapes for body 504 can be used as well.

Figure 28:
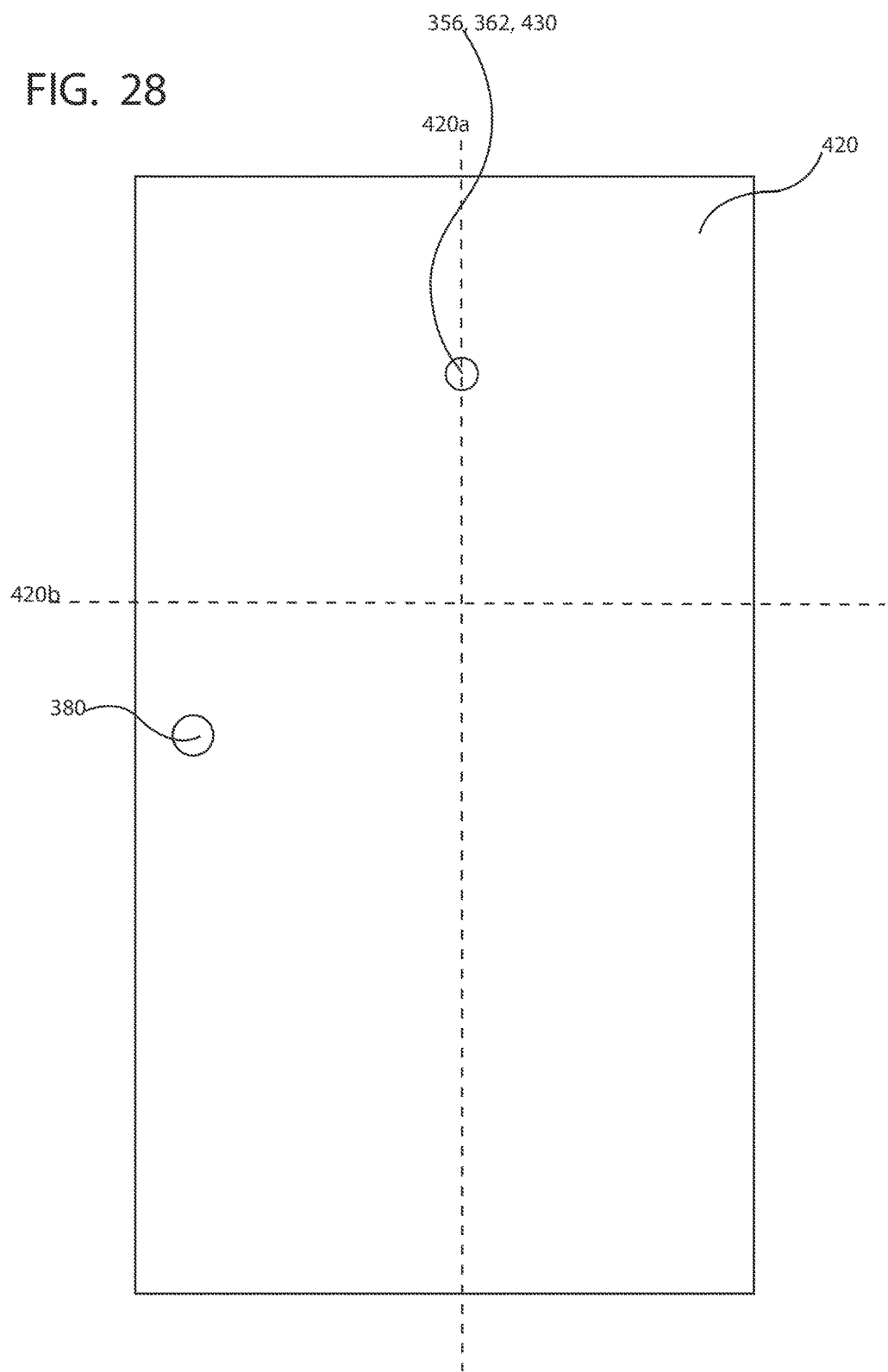
FIG. 28 shows an outside view of a door.

FIG. 28 is a view of the door. In this view there is shown the scope or camera 356, 362 or camera scope 430 extending out to an exterior section of the door 420. The door as shown in this view extends along longitudinal axis 420a and along latitudinal axis 420b. A doorknob is shown 380 wherein this doorknob is shown coupled to the door and configured to allow the door to be opened or closed.

Thus, this device is configured to provide additional views to 1 users so that the user has additional viewing angles so that the user does not have too many or even any blind spots.

Figure 29:
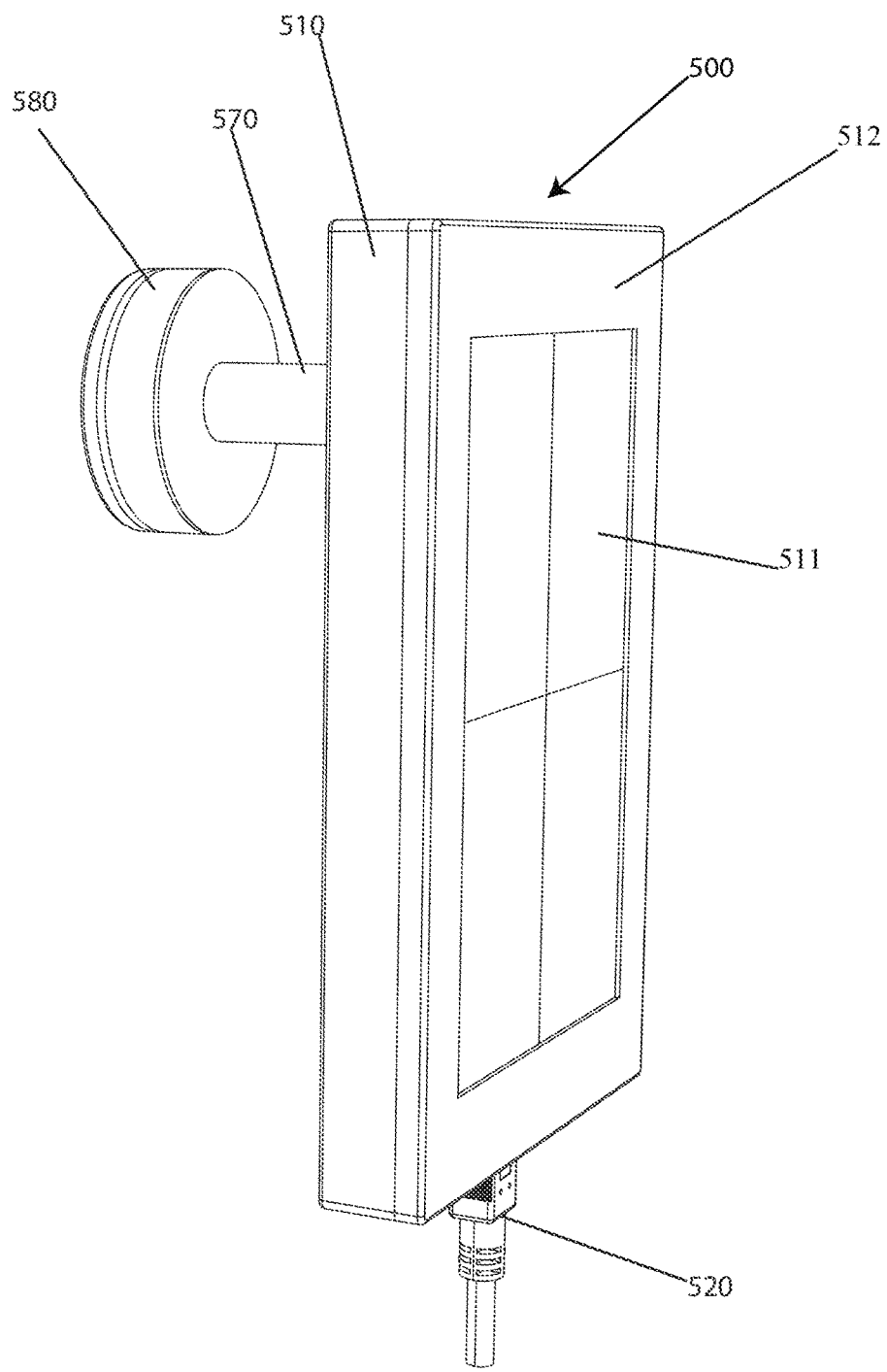
FIG. 29 shows a side perspective view of another embodiment.

FIG. 29 discloses a new embodiment 500 which includes a screen assembly 510, a camera assembly 580, and a channel 570 connecting the camera assembly 580 with the screen assembly 510. Screen assembly 510 includes at least a screen body 512, and a screen itself 511. Screen 511, is housed inside of screen body 512. Behind screen 511, are electronic components shown in FIG. 36. A cable 520 can be coupled to screen assembly 510 through a port not shown herein. This cable can supply power such as power over Ethernet (POE) or any other power or communication line as is suitable.

Thus, with this design, camera assembly 580 can be positioned on one side of a door while the screen assembly 510 can be positioned on the opposite side of the door. Channel 570 then extends through the door to bridge between the two assemblies.

Figure 30:
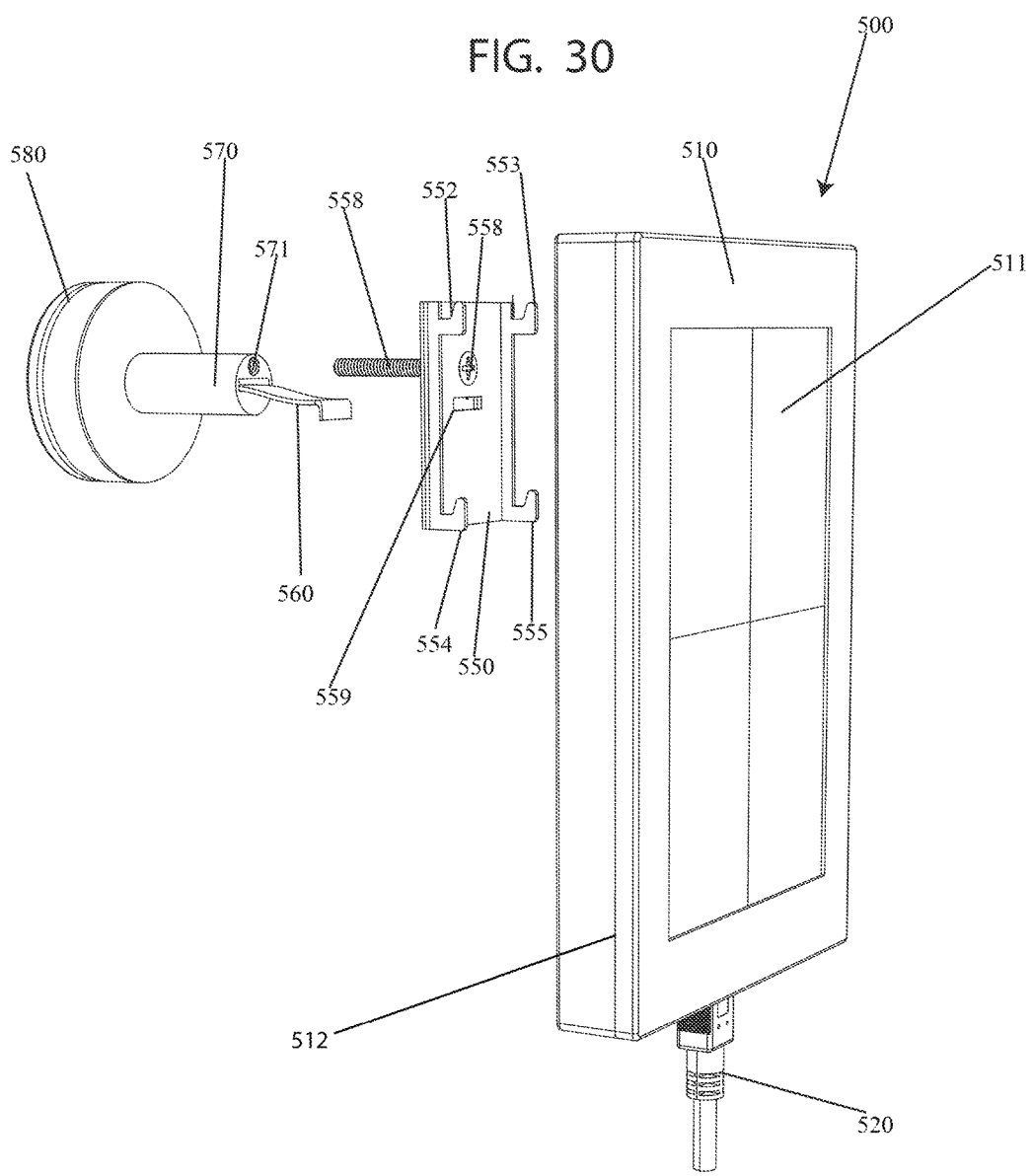
FIG. 30 shows a side exploded view of the embodiment of FIG. 29.

FIG. 30 shows a side perspective exploded view of the device shown in FIG. 29. For example, in with this embodiment 500, there is shown screen assembly 510 with screen 511 disposed inside of screen housing 512. As with FIG. 29, there is a cable 520 coupled to a bottom section of the screen. A coupling bracket 550 includes a bracket body, as well as at least four different bracket prongs 552, 553, 554, and 555. These bracket prongs extend out from the bracket body that are formed as substantially L-shaped hooks.

These substantially L-shaped hooks are configured to hook inside of a back face of the screen body. In addition, a screw 558 is coupled to coupling bracket 550. In addition, disposed inside of coupling bracket 550 is a cable slot 559. Cable slot 559 is configured to receive a cable 560. Cable 560 is configured to be coupled to the electronic components shown in greater detail in FIG. 36. Cable 560 extends inside of channel 570 all the way to camera assembly 580. A screw hole 571 in channel 570 is configured to receive screw 558. Thus, cable 560 can slide through cable slot 559, wherein cable 560 is then connected to the electronic components inside of the screen body 512 of screen assembly 510. In addition, screw 558 can be screwed into screw hole 571 to secure camera assembly 582 connection bracket 550. Connection bracket 550, can then be coupled to screen body 512 as shown in FIG. 31.

Figure 31:
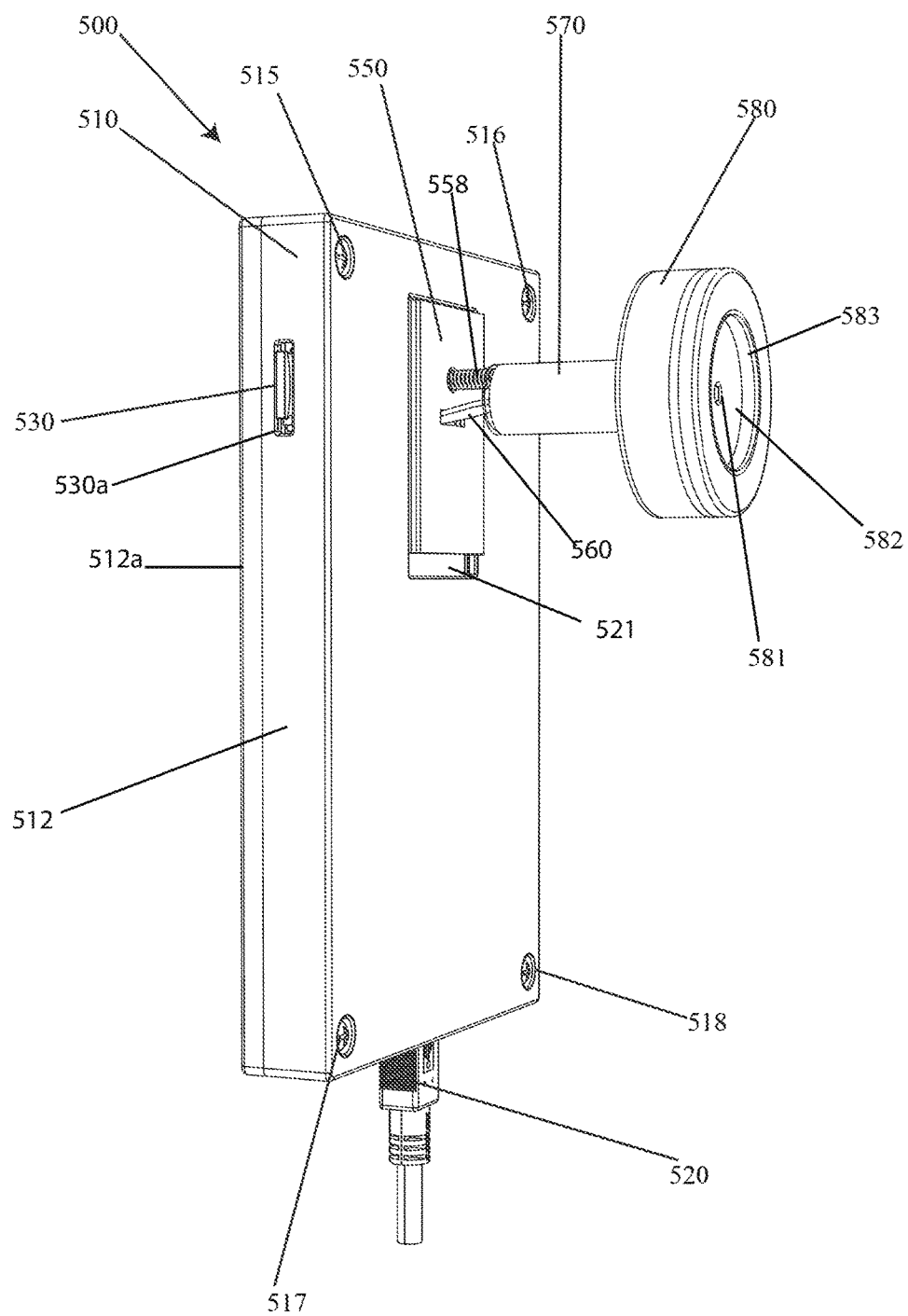
FIG. 31 shows a back semi assembled view of the embodiment of FIG. 29.

FIG. 31 shows a side—back perspective view of the embodiment shown in FIG. 29. In this view, connection bracket 550 is shown fitting into slot or recessed receptacle 521. As shown in this view, channel 570 is shown extending from camera assembly 580. Camera assembly 580 includes a camera 581, a camera face 582 and side walls 583. Camera assembly 580 can also include a covering such as a glass or transparent covering. As shown, there is also a screw 558 that connects column 570 to bracket 550. In addition as shown, there are also backing screws 515, 516, 517, and 518 which connect the body or housing 512 to a front plate 512a. In addition, as shown, there is a card 530 which extends into an opening 530a which connects card 530 to the motherboard which is housed inside of housing 512. The connection bracket 550 is fit snugly inside of recessed receptacle 521.

Figure 32:
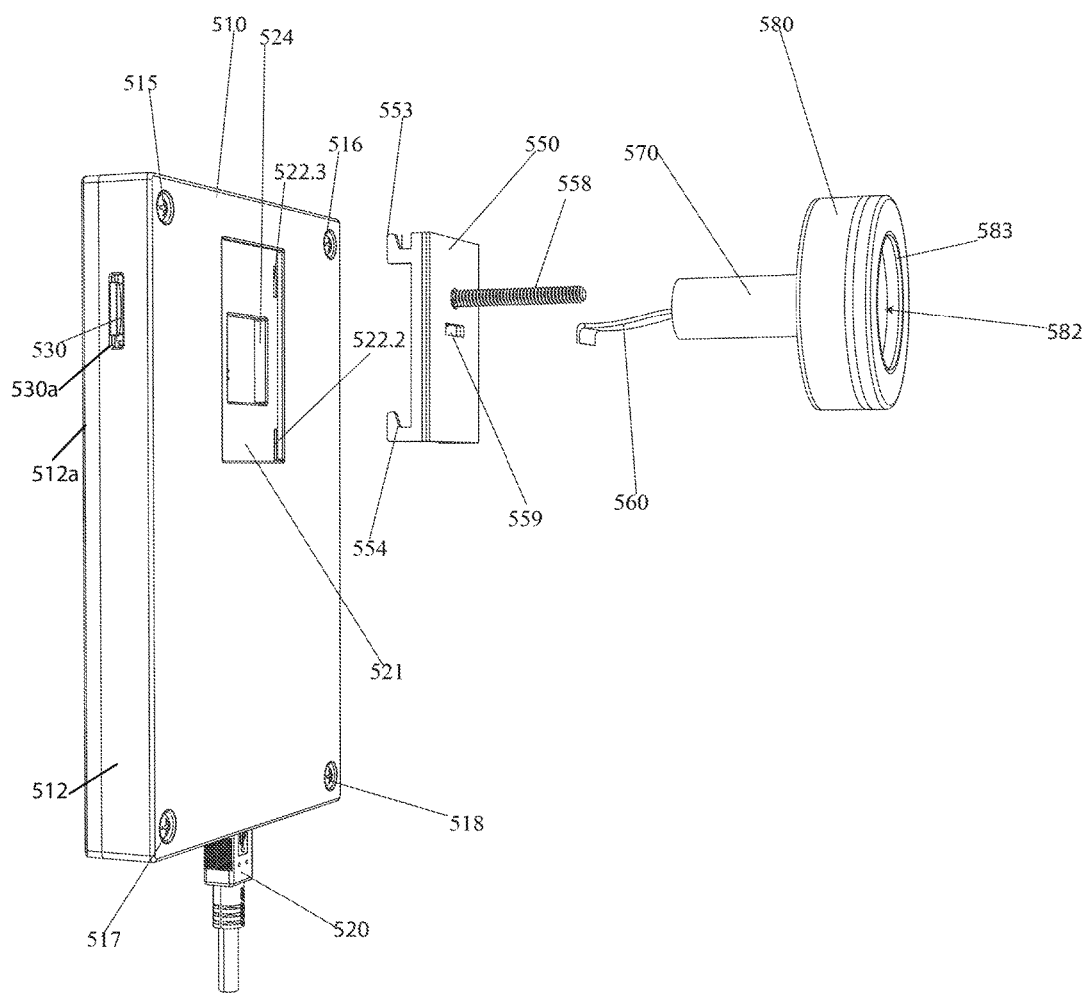
FIG. 32 is a back exploded view of the embodiment of FIG. 29.

FIG. 32 is a side exploded view which is similar structure shown in FIG. 31. In this view there is shown bracket 550 is shown removed from screen body 512. Prongs 554, and 553 are shown extending out from bracket 550 wherein these prongs 553, and 554 can be configured to extend into prong openings such as prong openings 522.1, 522.2, 522.3, and 522.4. Cable 560 can extend in through slot 560 and then extend through opening 524.

Figure 33A:
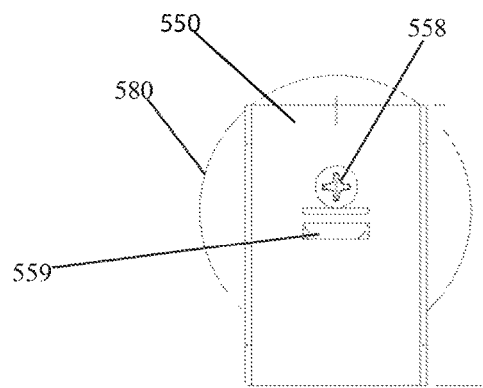
FIG. 33A is a back view of the bracket and camera element.
Figure 33B:
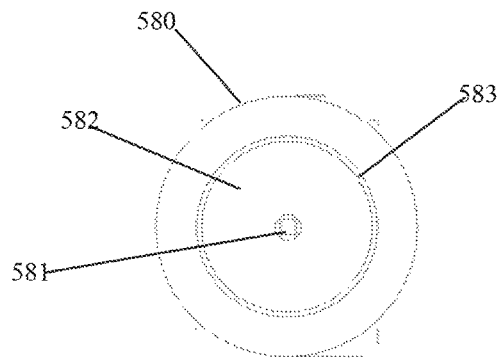
FIG. 33B is a front view of the camera element.
Figure 33C:
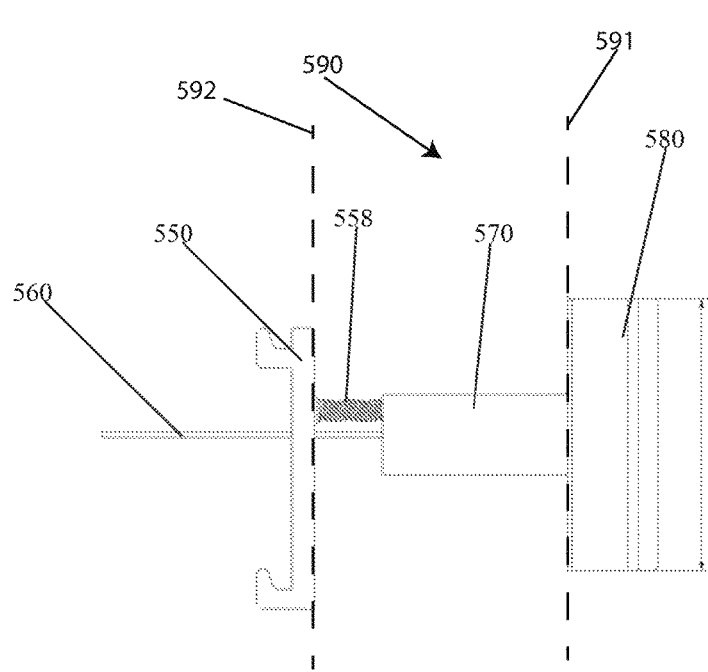
FIG. 33C is a side view of the camera element.

FIG. 33A is a back view of the camera body which shows a connection bracket having a cable slot 559 and screw 559. FIG. 33B shows a front view of the camera body 580 which includes a camera 581, a back camera plate 582, and annular or substantially circular side walls 583. FIG. 33C shows a side view of the camera body 580, and column 570 which is coupled to camera body 580. A screw 558 which extends back from column 570 and extends out to plate 550 to support plate 550 extending substantially rigidly from column 570. Cable 560 extends from column 570 and provides a direct link between the camera and the motherboard of the main electronic assembly. The walls of this camera can be made flush with the door, or curved to be made tamper proof so that the camera does not have any flat surfaces which would make it easy to tamper with.

FIG. 34 is a back view of the screen assembly 510. In this view, there are screw holes 525, 526, 527, and 528. There are prong openings 522.1, 522.2, 522.3 and 522.4 which are configured to receive prongs. In addition, opening 524 is also shown. Furthermore, opening 529 is also configured to receive a cable 520.

Figure 35:
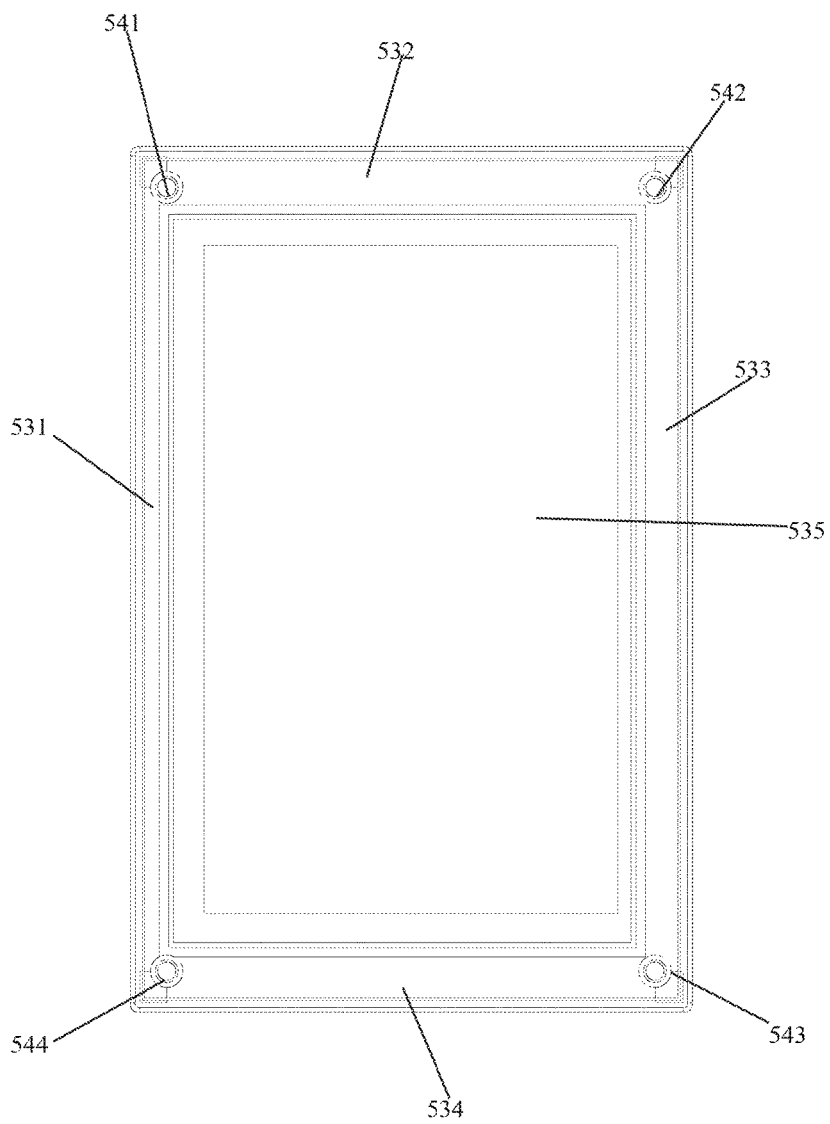
FIG. 35 is a front view of the housing bracket with the screen not disposed therein.

FIG. 35 is a front view of the housing bracket with the screen not disposed therein. This bracket or middle housing section 512 includes sides 531, 532, 533, and 534. There are screw holes 541, 542, 543, and 544, which are configured to receive screws 515, 516, 517, and 518. In addition, there is an open back 535, which is configured to receive back plate 522.5.

Figure 36:
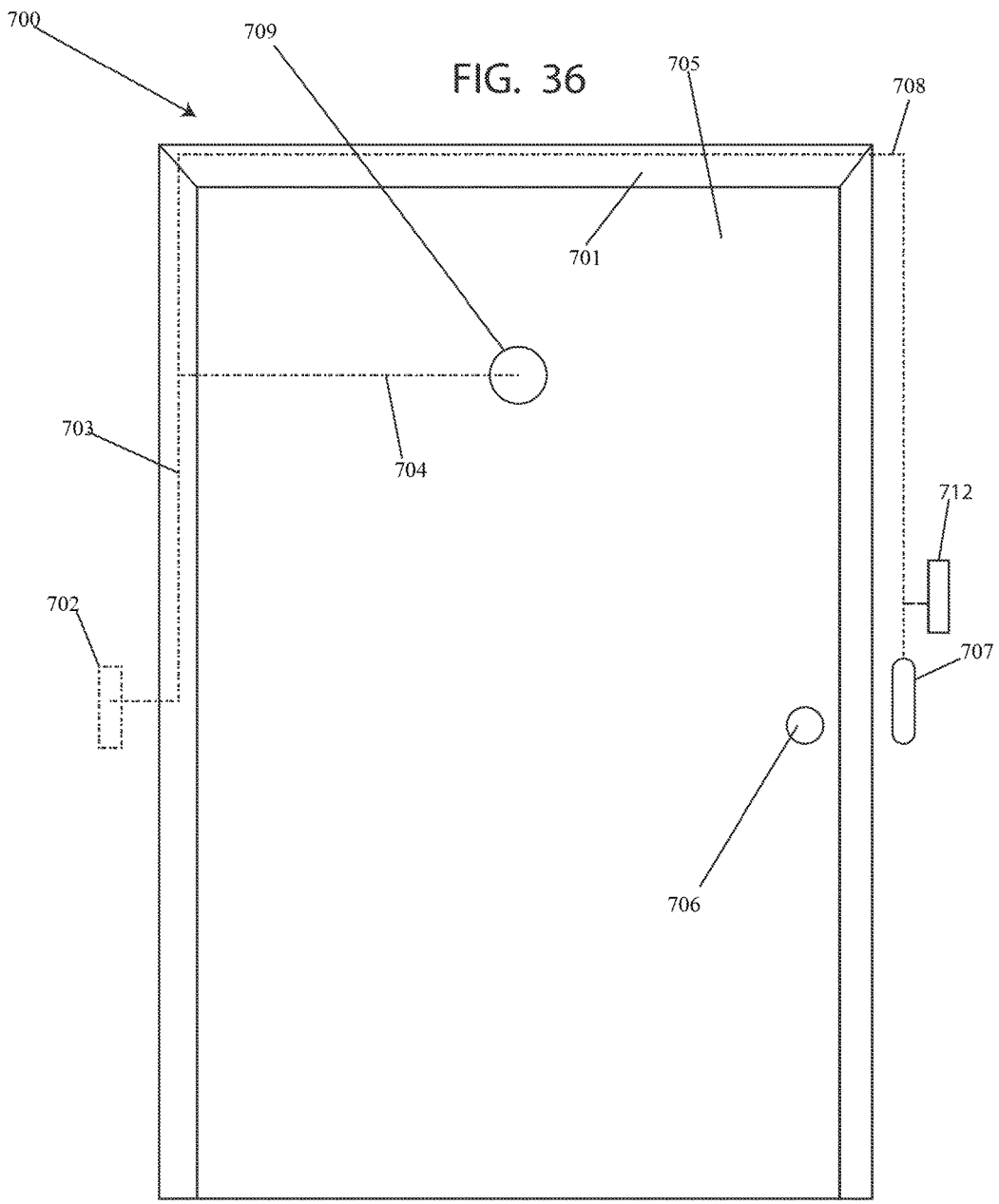
FIG. 36 is a view of a door from the outside.

FIG. 36 is an outside view of a door assembly 700 which includes a camera assembly 709 which is equivalent to a camera assembly 580. Door assembly 700 includes a door frame 701, and a door itself 705. Disposed on the opposite side of the door, there is shown a switch 702 which include a power cable 703 which can extend in a channel of door frame 701. This cable 704 can be used to power camera 709. In addition, power cable 708 which extends out from power cable 703 then extends to a sensor housing 707. Sensor housing 707 is configured to house sensor 618. In addition there can be a doorbell 712 which can be coupled to power line 708 as well. Camera is essentially a camera that represents any of the cameras disclosed herein.

Figure 37:
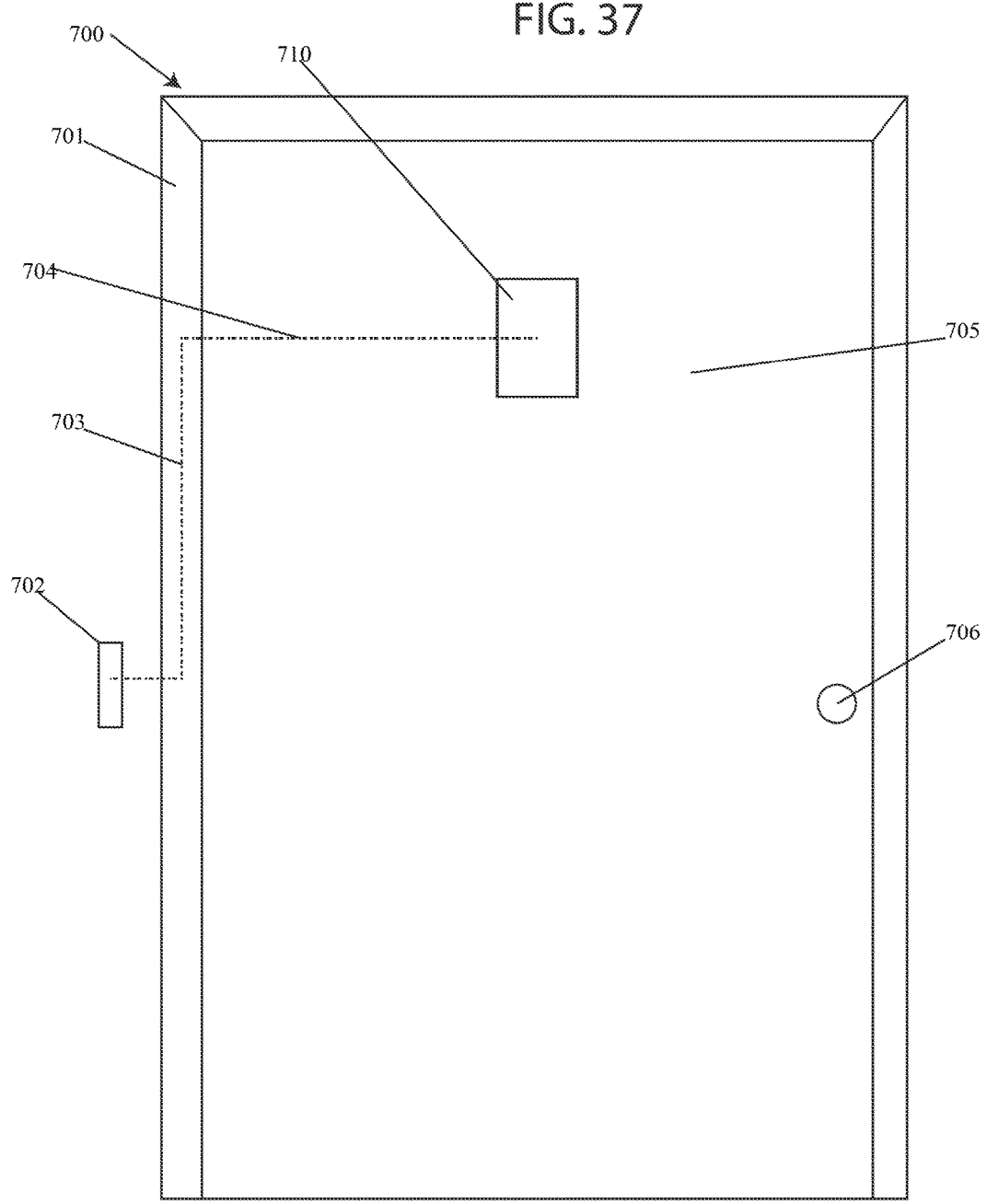
FIG. 37 is a view of a door from the inside.

FIG. 37 is an inside view of a door which shows a screen housing 710. Screen housing 710 is configured to house any type of a screen such as screen assembly 510. The associated screen is configured to receive power from power cable or line 704. Thus, this door assembly is configured to allow the system to communicate in a closed environment which allows for a door assembly to be weather resistant which can have a camera which can be configured to have a night vision or infrared view.

Figure 38:
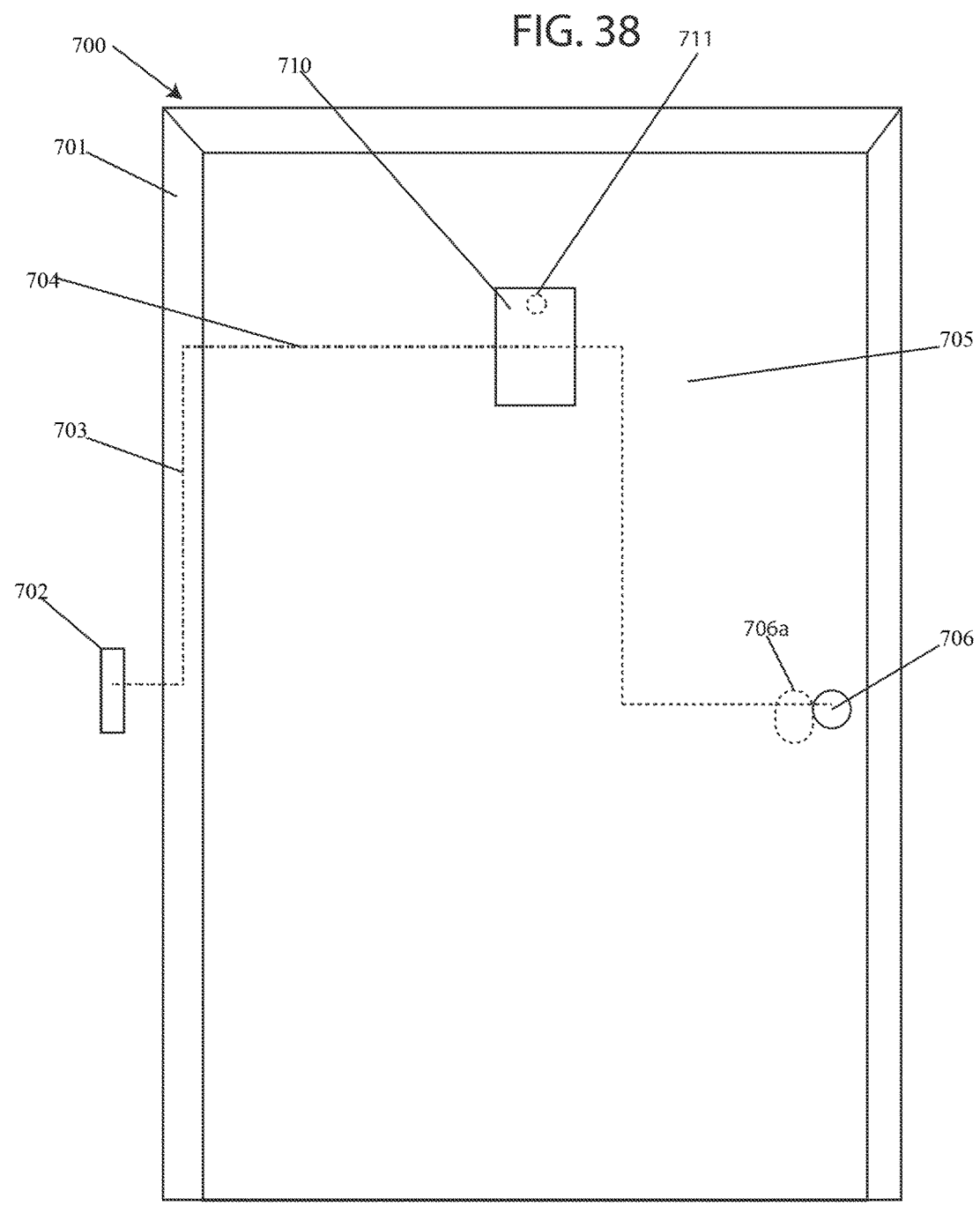
FIG. 38 is a front side view of another embodiment.

FIG. 38 shows another embodiment which shows an electromechanical device 706a which is configured to unlock a door such as door 705. This electro mechanical door unlocking device 706*a* is powered from line 704 and is configured to selectively automatically unlock door 705 based upon either biometric authentication or facial recognition software which is powered by camera 711. In addition in this embodiment, both sides of the door have a screen 710 and an associated camera 711. Disposed on the side of the door are projectors 740 and 742 which can also or in the alternative project the image of the person being viewed in the camera.

Figure 39:
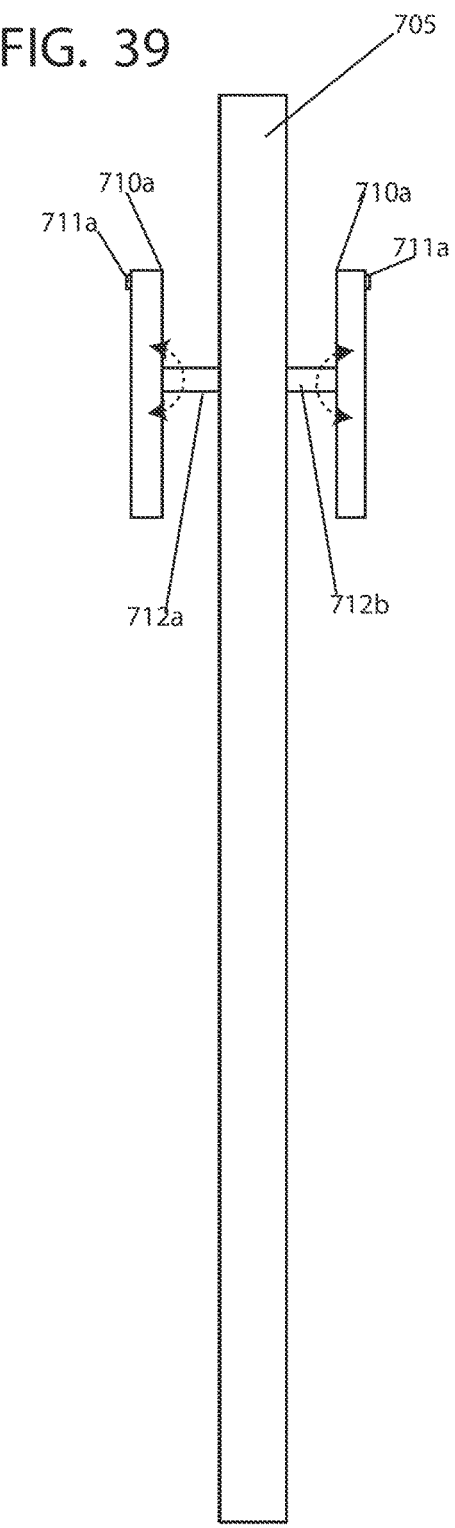
FIG. 39 is a side view of another embodiment.

FIG. 39 shows a side view of door 705 of this type of embodiment. With this embodiment, there are two sets of screen and camera combinations. With this design, there is a first screen 710*a* and a first camera 711*a* and a second screen 710*b* and a second camera 711*b*. Each of these screen and camera combinations are configured to be coupled to door 705 via an adjustable arm 712*a* and 712*b* respectively. Thus, each of these screen and camera combinations can be rotated so that the screen and camera combination can be viewed and used by any person of any height. Alternatively, instead of a screen, the camera can be coupled to a projector 744 to allow for viewing of the user on the other side of the door. The projector 744 can be displayed on the door itself, or on an adjacent wall or in another region of the home. In this view, there can also be at least one or a plurality of projectors.

FIG. 39A is a side cross-sectional view of a camera for use with the screens or displays disclosed herein. With this view there is a camera 720 which is a camera that can be automatically controlled by a button or joystick or a plurality of buttons on a screen such as the screens disclosed herein. This camera is shown embedded in a door such as door 735. The front part of the frame of the door 733 is configured to hold the camera in place. Outer shell 721 is coupled to the front part of the frame of the door 733. Inner shell 722 is disposed inside of outer shell 721. A plurality of wheels 728 and 729 which are positioned transverse to each other are configured to drive the inner shell 722 around inside of outer shell 721. A drive body 730 is configured to drive wheels 728 and 729. A camera chip much like camera chip 801 described blow is configured to receive visual information. A camera seat 731 is coupled to camera body 726 which is configured to house much of the camera electronics. A cable or line 727 is coupled to the outer shell and this cable 727 passes electrical and communication information into camera chip 725.

Essentially, the drive body includes an electrical motor which drives wheels 728 and 729 to drive the angle of attack of the camera to different directions. These different directions can be up, down, left, right or any other suitable direction. The user who may be positioned on the other side of the door can then use the touch screen such as touch screen 111, or 150, 511 or 710 for example to control this type of camera.

FIGS. 39C-39H show adjustable body section 786, which includes clamp 768, and clamp arm 768.1. When clamp 768 is rotated in a predetermined manner it drives clamp arm 208.1 into clamp body section 786.

Figure 39B:
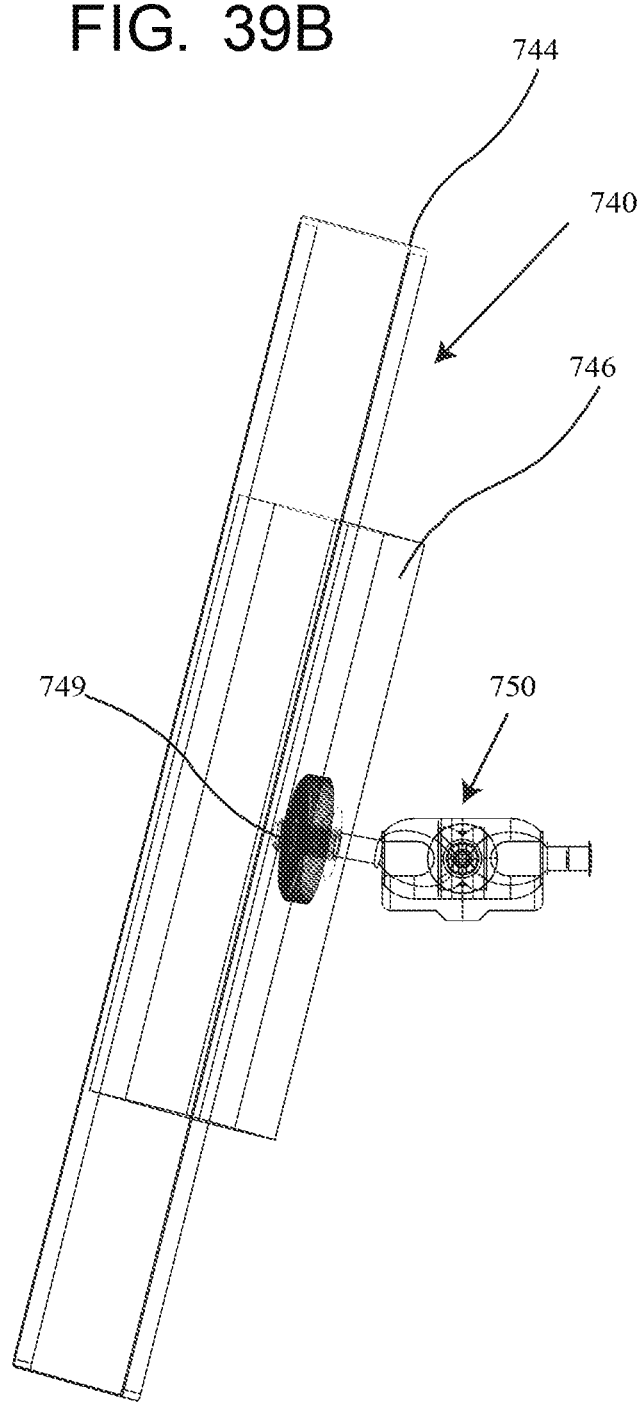
FIG. 39B is a side cross sectional view of another embodiment.
Figure 39C:
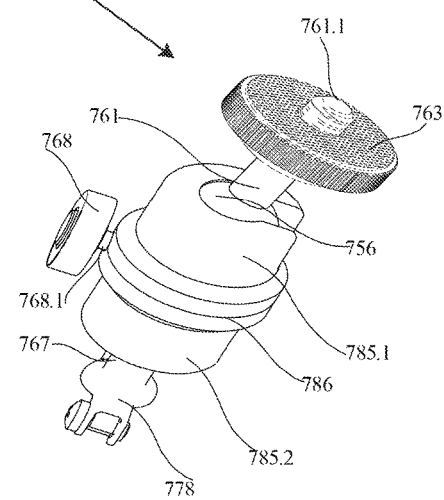
FIG. 39C is a side view of the adjustable connection of FIG. 39B.
Figure 39D:
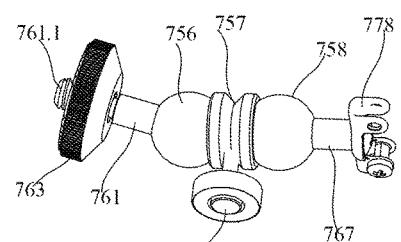
FIG. 39D is a side perspective view of a portion of the adjustable connection of FIG. 39B.
Figure 39E:
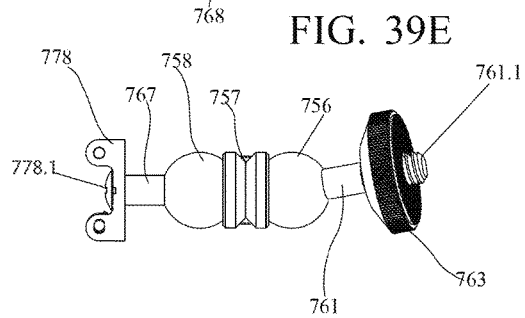
FIG. 39E is a side view of a portion of the adjustable connection of FIG. 39B.
Figure 39F:
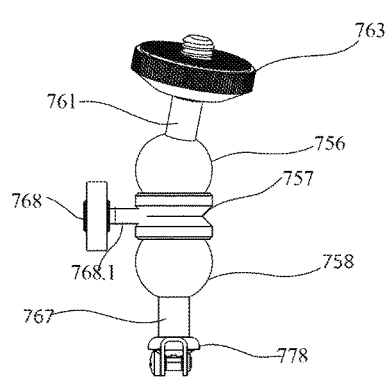
FIG. 39F is a side view of the adjustable connector of FIG. 39B.
Figure 39G:
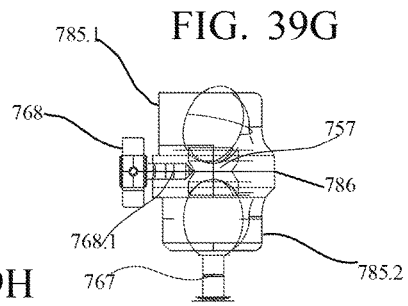
FIG. 39G shows an end view of the adjustable connector of FIG. 39B.
Figure 39H:
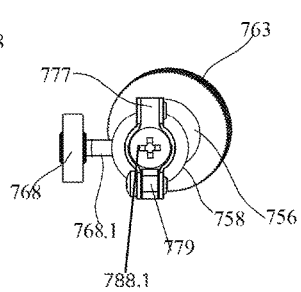
FIG. 39H shows a side see-thru view of the embodiment shown in FIG. 39B.

FIGS. 39D through 39H show different views of adjustable section 750 with first body part 755.1 and second body part 755.2 removed. As shown in these views, there are a plurality of ball joints 756, and 758, positioned within a clamp seat 757. As clamp arm 208.1 is driven into clamp seat, 757, it exerts pressure on ball joints 758, and or 756 which one position within first body part 785.1, and second body part 785.2, respectively. This clamps the ball joint in a fixed position. Essentially, because there are two ball joints which are movable within the ball seat 757 creating a multidimensional, easily adjustable device which allows for positioning of the screen and almost any angle and in nearly any position. This omnidirectional double ball joint system is similar to that shown in FIG. 39B. An additional coupling arm 767 is coupled to a coupling end 778 which is configured to be coupled to a mount or base such as base 190 and then tightened into place via screw 788.1, and clamped via clamping elements 777 and 779.

Figure 40:
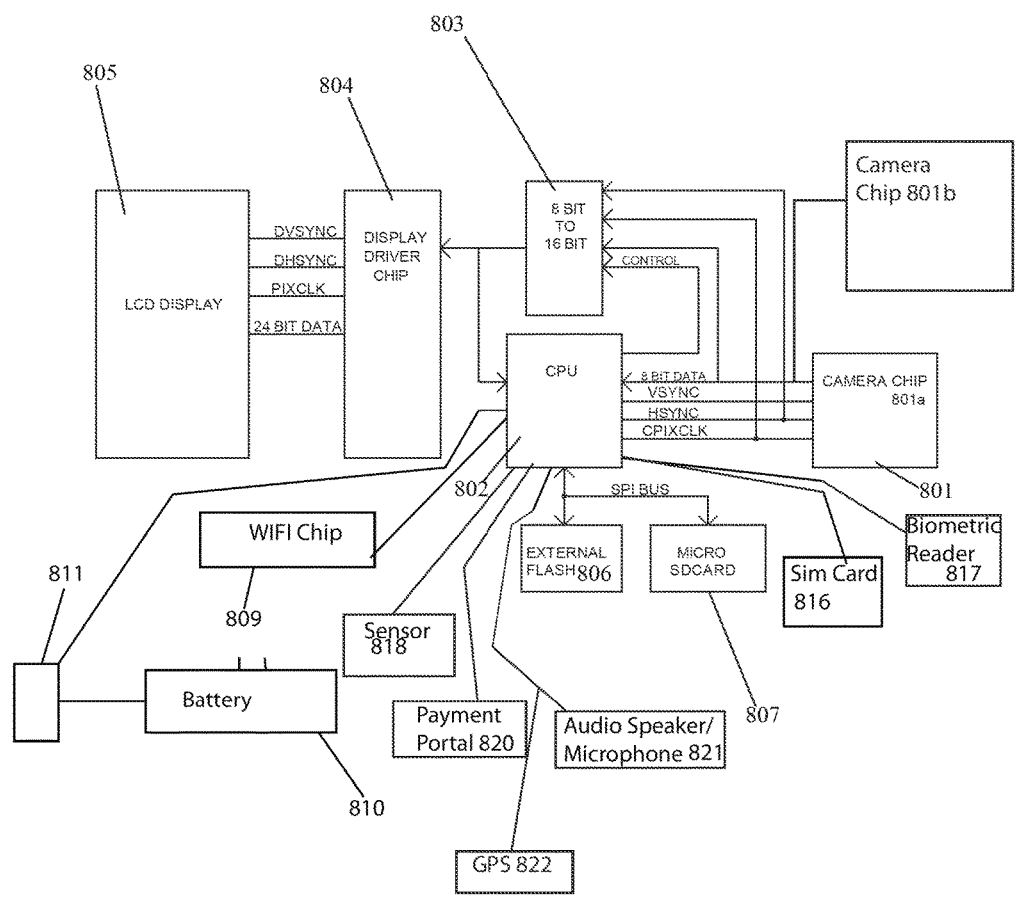
FIG. 40 is a schematic block diagram of the electronic components.

FIG. 40 shows one embodiment which may be a preferred embodiment which is a block diagram of the electronic components which comprise any of the screens in combination with any one of the cameras disclosed herein, as well as any other suitable electronic components. The apparatus includes camera chip 801, CPU 602, data converter 803, display driver chip 804, LCD display 805, flash chip 806 and micro SD Card 807 which can include card 530 shown in FIG. 31.

Camera chip 801 is one of several types. In the current embodiment, the chip provides an integrated lens, 640*480 full color pixel array sensor, control electronics, an 8 bit data output bus and a control bus. CPU 802 sends commands to the camera chip to initialize it and to control the capture and format of data.

Typically, one of several formats can be chosen for the representation of full color images. CPU 802 selects a format that is compatible with display driver 804 to reduce the amount and convolution of data required to display a good image.

Data from the camera chip is ported to both CPU 802 and to the display driver chip 804, via data converter 803. The display driver 804 can accept data in several widths (8 bit, 16 bit, 24 bit) and formats (RGB656, RGB888, etc). The current embodiment programs camera chip 801 to send image data in the RGB656 format, which consists of 2 bytes containing 5 bits of red color information, 6 bits of green color information and 5 bits of blue color information. Display driver 804 can accept this data in 16 bit format; since the camera chip outputs the data in 8 bit widths, data converter 803 is used to convert the 8 bit data into 16 bit RGB656 format data. Display driver 804 contains sufficient memory to store at least 1 frame of display data.

The display driver 804 has many registers to control the appearance of the LCD display 805, so it is connected to CPU 802 using the same bus as data converter 803. CPU 802 programs these registers before beginning the image display and also writes a command to display driver 804 at the start of every display frame to describe where the forthcoming data from data converter 803 is to be displayed on LCD display 805.

A frame of data is defined by signals VSYNC and HSYNC and CPIXCLK. VSYNC is set high when an image frame is to be output from camera chip 601. Each line of the image is qualified by HSYNC which goes high when valid pixel data is available on the data outputs of camera chip 801. HSYNC goes low when the line of data ends and signals that a new line of data is about to begin. CPIXCLK pulse high for each byte of data sent by camera chip 801. CPU 802 can either accept this data (to save frame(s) to micro SDCard 807, or can send this data to display driver chip 804 via data converter 803.

The sequence of events required to capture and display an image frame is this: CPU 802 monitors signal VSYNC from camera chip 801. When VSYNC is detected high by CPU 802, CPU 802 programs display driver 804 with the addresses of the data that is to be written to the LCD display. Once this is programmed CPU 802 activates data converter 803. Data converter 803 accepts HSYNC and CPIXCLK and uses these signals, along with the data signals from the camera chip to assemble a 16 bit wide RGB656 word and subsequently write that word to display driver chip 804. Display driver chip 804 takes these RGB656 and stores them sequentially into its internal frame memory. Display driver chip 804 uses the frame memory to generate the signals DVSYNC, DHSYNC, PIXCLK and the 24 bit data (8 bits each of red, green and blue) for display on LCD display 805.

CPU 802 continues to monitor signal VSYNC from camera chip 801. When VSYNC goes low, the frame has been completed and CPU 802 turns the data converter off and begins looking for a new frame of data. When CPU 802 sees VSYNC go high again it starts the display sequence again. This provides full motion data from the camera to be displayed on the LCD display 805.

LCD Display 805 incorporates a touch screen interface for the apparatus. This interface permits the user to capture an image or a video from the camera chip to micro SDCard 807. This image can be used for identification or verification of events. Flash chip 806 holds images that can be displayed on a portion of LCD display 805 and includes virtual buttons or physical buttons, help instructions, or general information for the operation of the apparatus. CPU 802 can generate information that can be displayed on LCD screen 805 instead of video or as an adjunct to the video display. In addition coupled to CPU are other optional components.

For example the optional components include a WIFI chip which can be used to allow the camera and CPU 802 communicate with another computer network. In addition there can be a battery 810. There is also an Ethernet connection port 811 which is coupled to CPU 802. Other optional components can include a sensor 818. Sensor 818 can be any one of the following sensors: RFID sensor, a motion sensor, a door ajar sensor, a fingerprint scanner, a thermal sensor, and a proximity sensor alarm. In addition there is also shown a sim card 816, and a biometric reader 817. There can also be an audio speaker or a microphone 821 wherein the users can communicate between each other by communicating using the audio speaker and a corresponding microphone. This audio speaker and microphone can be embedded into the screen assembly 510.

In all, there is shown, multiple different embodiments. These embodiments allow for the user to have a screen which allows the user to have greater visibility while viewing through a door. This screen can be associated with any suitable electronic components such as for example, a simple screen assembly, a smart phone, a camera screen, or any other type of electronic device suitable for use with a camera. In addition, multiple different cameras are shown connected to this electronic device. For example, a simple camera assembly such as camera 200 can be used. Alternatively, more complex camera assembly such as camera similar to 10, having worked collocated lens assemblies can also be used.

Figure 41A:
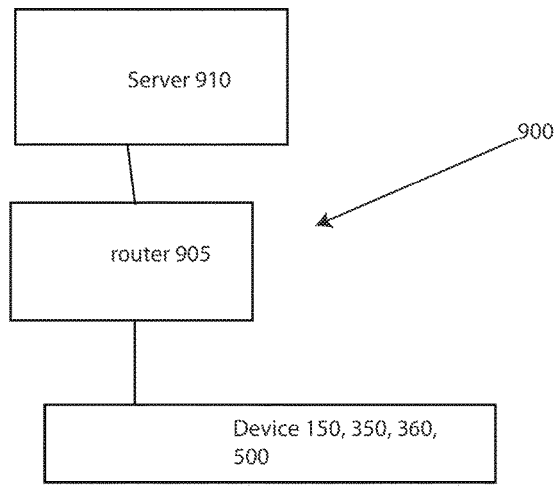
FIG. 41A is a view of a first network layout.

FIG. 41A shows a layout of a connection of these electronic components to computer network. Computer network 900 can be coupled either with in a wired or wireless manner to the electronic devices such as electronic device 150. Computer network 900 includes at least one server 910 which is in communication with an electronic device such as electronic device 150 through router 905. Server 910 is configured as a base recording server for recording, any activity that is suitable to be viewed on any of the electronic devices such as electronic device 150. In addition projectors 740, 742, and 744 can be coupled to this network 900 as well so that information from the camera can be transmitted to the projector.

Figure 41B:
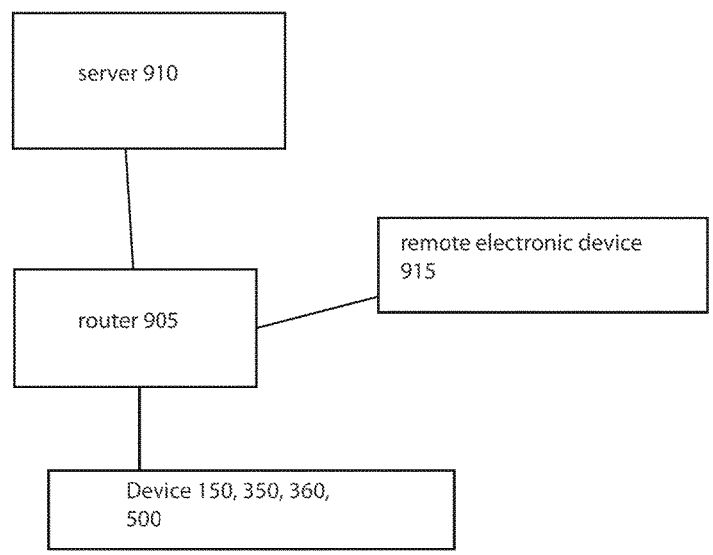
FIG. 41B is a view of a second network layout.

FIG. 41B shows a layout of a more complex computer network. In this view there is shown a remote electronic device 915 which is coupled to or in communication with router 905. With this type of connection, remote electronic device can display the view provided by electronic device 150 either through an intranet connection or an internet connection. In addition projectors 740, 742, and 744 can be coupled to this network 900 as well so that information from the camera can be transmitted to the projector.

Figure 42:
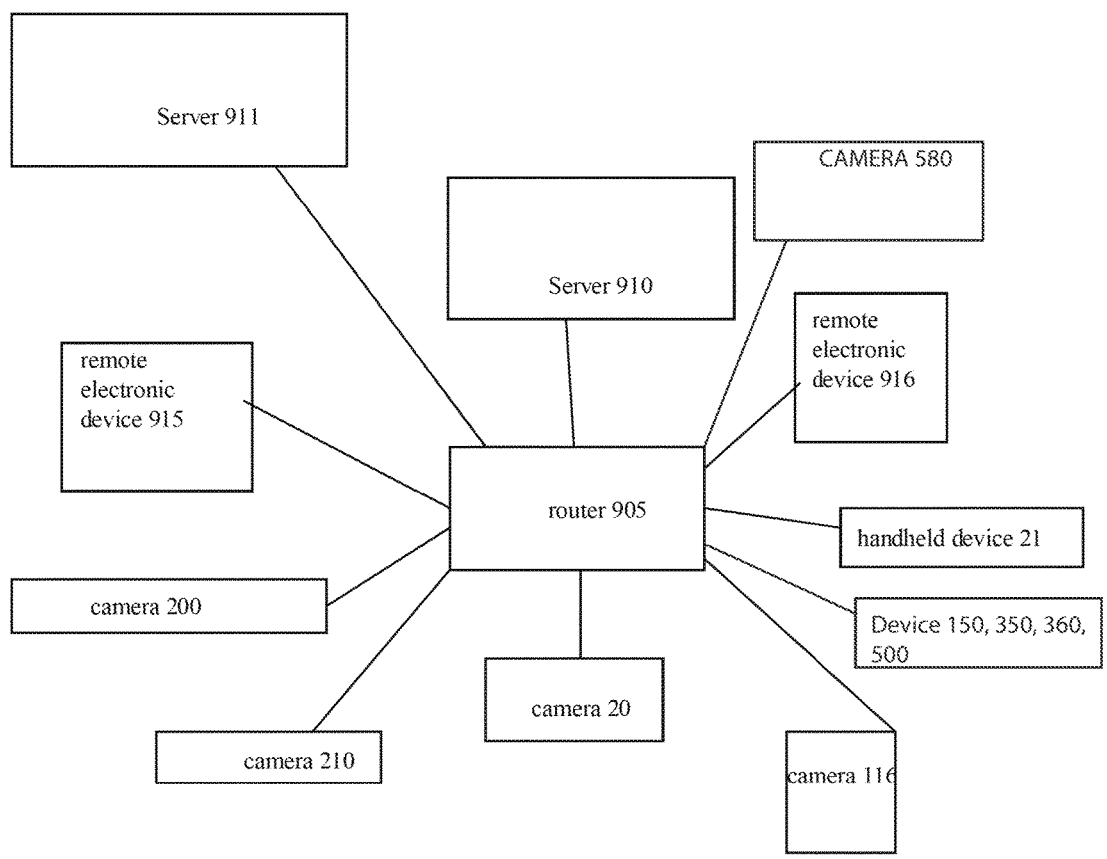
FIG. 42 is a view of a third network layout.

FIG. 42 is a view of a more complex computer network. In this network, any one of cameras can be in communication with router 905. Coupled to router 905 is any one of servers 910 or 911. For example, server 910 can be in the form of a mass storage server while server 911 can be in the form of an application server as well. This application server is configured to provide management applications to control the viewing and recording of the cameras 20, 116, 200, and/or 210. In addition, there is shown remote electronic devices 915, 916, or handheld device 21 which are/can be coupled to router 905 for communication with router 905. In at least one embodiment, handheld device 21, is coupled to lens/camera 20 for recording purposes. As described above, handheld device 21 can be any suitable handheld electronic device such as a screen, or a smart phone which is configured to be coupled to lens/camera 20. In addition projectors 740, 742, and 744 can be coupled to this network 900 in a wired or wireless manner as well so that information from the camera can be transmitted to the projector. In this way information from one or more projectors can be segmented and selectively displayed on a surface such as a door.

Each of these components can communicate with each other via a wired connection. Alternatively each of these components such as the cameras 20, 116, 160, 170, 180, 200, 210, 355, and 357, 580, 709, 720 are configured to contain a wireless transceiver such as 20i, 116i, 160i, 170i 180i, 200i, 210i, 355i, and 357i which provides these cameras the ability to communicate with any other wireless components such as a computer server or a screen. Thus each screen can also communicate in a wireless manner with any one of the other electronic components such as the cameras or other servers. These screens can include but are not limited to screens 21, 110, 150, 350, 360, 500 and 710. These screens have corresponding wireless transceivers 21i, 110i, 150i, 350i, and 360i. The communication for these components can be via wireless internet protocols such as WIFI, cellular, SIM, or bluetooth or any other suitable wireless communication protocol.

Ultimately, this system can be designed to include a camera which can be configured to have a night vision camera, and an infrared sensor.

Accordingly, while at least one embodiment of the present invention has been shown and described, it is obvious that many changes and modifications may be made thereunto without departing from the spirit and scope of the invention.

What is claimed is:

1. An apparatus for mounting on a door, the apparatus comprising:
at least one mount;
at least one electronic device configured to be coupled to said at least one mount; at least one camera coupled to the electronic device and to said at least one mount; wherein said at least one mount comprises at least one coupling element for coupling said at least one electronic device to said at least one mount and wherein said at least one mount is configured to allow said at least one electronic device to be mounted on a surface;

at least one electro mechanical device in communication with said electronic device and configured to selectively unlock the door;

at least one telescoping scope coupled to said at least one camera and to said at least one electronic device, said at least one telescoping scope configured to extend through the door from an inside surface of the door to an outside surface of the door while allowing said at least one camera and said at least one electronic device to remain on an inside surface of the door.

2. The apparatus as in claim 1, wherein said at least one electronic device comprises a screen.

3. The apparatus as in claim 1, wherein said at least one mount further comprises a body configured to receive said at least one electronic device.

4. The apparatus as in claim 1, further comprising at least one adjustable arm.

5. The apparatus as in claim 4, wherein said at least one adjustable arm comprises a ball and socket joint.

6. The apparatus as in claim 1, wherein said at least one camera further comprises at least one lens assembly.

7. The apparatus as in claim 6, wherein said at least one lens assembly further comprises at least one screw connection.

8. The apparatus as in claim 7, wherein said at least one mount further comprises at least one screw receptacle for receiving at said at least one screw connection.

9. The apparatus as in claim 1, wherein said at least one electronic device comprises a display, and at least one display housing, and wherein said at least one coupling element comprises a bracket which comprises a plurality of prongs, and wherein said plurality of prongs are configured to fit into said at least on display housing to selectively couple said at least one camera to said at least one display housing.

10. The apparatus as in claim 9, further comprising a least one screw, coupled to said at least one bracket, wherein said at least one screw is configured to couple said at least one bracket to said at least one camera.

11. The apparatus as in claim 10, wherein said at least one display housing further comprises a plurality of recesses configured to receive said plurality of prongs configured to fit inside of said at least one display housing.

12. The apparatus as in claim 11, wherein said bracket has at least one hole which is configured to receive at least one cable from said at least one camera.

13. The apparatus as in claim 12, wherein said screw is configured to selectively screw into said at least one bracket to selectively space said at least one camera from said at least one bracket.

14. The apparatus as in claim 13, wherein said prong on said bracket is substantially L-shaped.

15. The apparatus as in claim 14, wherein said at least one display is rotatable about said at least one mount.

16. The apparatus as in claim 1, wherein said at least one mount is electrically coupled to cabling inside of a door.

17. The apparatus as in claim 16, wherein said at least one camera is configured to move in an omnidirectional manner.

* * * * *